United States Patent
Fukumoto et al.

(10) Patent No.: US 6,223,018 B1
(45) Date of Patent: Apr. 24, 2001

(54) INTRA-BODY INFORMATION TRANSFER DEVICE

(75) Inventors: Masaaki Fukumoto; Yoshinobu Tonomura, both of Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 08/989,656

(22) Filed: Dec. 12, 1997

(30) Foreign Application Priority Data

Dec. 12, 1996 (JP) .................................................. 8-331825

(51) Int. Cl.[7] ....................................................... H04B 5/00

(52) U.S. Cl. ............................................. 455/4; 379/55.1

(58) Field of Search ............................ 455/100, 39, 435, 455/41; 379/38, 37, 55.1

(56) References Cited

U.S. PATENT DOCUMENTS

| | | | |
|---|---|---|---|
| 3,958,560 | * 5/1976 | March | 128/2 |
| 4,334,315 | * 6/1982 | Ono | 455/11 |
| 4,763,340 | * 8/1988 | Yoneda | 375/121 |
| 4,918,737 | * 4/1990 | Luethi | 381/68.4 |
| 4,980,626 | * 12/1990 | Hess | 318/568.16 |
| 4,988,981 | * 1/1991 | Zimmerman | 340/709 |
| 5,864,755 | * 1/1999 | King | 455/404 |
| 5,914,701 | * 6/1999 | Gersheneld | 345/156 |

FOREIGN PATENT DOCUMENTS

| | | |
|---|---|---|
| 58-177672 | 10/1983 | (JP) . |
| 61-221479 | 10/1986 | (JP) . |
| 3-75065 | 3/1991 | (JP) . |
| 7-170215 | 7/1995 | (JP) . |

OTHER PUBLICATIONS

T.G.Zimmerman, "Personal Area Networks: Near–field intrabody communication", IBM Systems Journal, vol. 35, No. 3&4, 1986, pp. 609–617.

T.G. Zimmerman, "Personal Area Networks: Near–field intrabody communication" (Japanese Counterpart of E), Nikkei Electronics 1997.6.2 (No. 690), pp. 141–148.

Masaaki Fukumoto, Akira Hiraiwa, and Noboru Sonehara, "'FingeRing': A Keyboard Device for Wearable Computers", The Transactions of the Institute of Electronics, Information and Communication Engineer A, vol. J79–A, No. 2, pp. 460–470, Feb. 1996.

Masaaki Fukumoto and Yoshinobu Tonomura, "'Body Coupled FingeRing': Wireless Wearable Keyboard", CHI'97 Conference Proceedings, pp. 147–154, Atlanta Mar. 1997 (The first half portion describes the subject matter of Ref. G).

* cited by examiner

Primary Examiner—Daniel Hunter
Assistant Examiner—Nick Corsaro
(74) Attorney, Agent, or Firm—Pennie & Edmonds LLP

(57) ABSTRACT

An information transfer device which transfers a signal via a human body, comprising: a transmitter having a signal source for outputting a time varying signal, a modulator for modulating a signal from the signal source using a carrier frequency of from several tens of KHz to several MHz, a transmission B electrode connected to an output from the modulator and arranged in the vicinity of a human body surface, and a transmission G electrode connected to a portion giving a reference voltage of the transmitter and arranged toward an external side with respect to the human body, and a receiver having a reception B electrode arranged in the vicinity of the human body surface in the vicinity of the transmitter, a reception G electrode connected to a portion giving a reference voltage of the receiver and arranged toward an external side with respect to the human body so as to be coupled with the transmission G electrode via air, an amplifier for amplifying a voltage between the reception B electrode and the reception G electrode, and a demodulator connected to an output from the amplifier for demodulating a signal output from the signal source of the transmitter.

23 Claims, 27 Drawing Sheets

FIG.31

| CHORD PATTERN | KEY CODE KCD7 |
|---|---|
| [10000] | 'A' |
| [01100] | 'B' |
| [01020] | 'C' |
| [12203] | 'D' |

INTRA-BODY INFORMATION TRANSFER DEVICE

BACKGROUND OF THE INVENTION

1. Field of the Invention

The present invention relates to a near-field data communication device which is ultra small and is capable of operation with low power, and in particular to an intra-body information transfer device which transfers a signal via a human body. This application is based on a Japanese patent application (Japanese Patent Application No. Hei 8-331825 (1996)), whose description is incorporated herein as a part of this specification.

2. Description of the Related Art

With conventional near-field data communication devices using light or radio wave (airwave), there are problems in that the power consumption is large and the device itself is large. On the other hand, if the communication method uses an electrostatic field induced in a human body, it is easy to reduce the power consumption. As a communication method using an electrostatic field induced in a human body, there can be mentioned a transfer method introduced by T. Zimmerman, "Personal Area Networks (PAN): Near-Field Intra-Body Communication", Masters Thesis MIT Media Laboratory, Sept. 1995 (hereinafter referred to as the "ZIM method"). The ZIM method performs communication by transfer of high frequency-modulated signals via a route including a human body and an earth ground, and communication with reduced power consumption is made possible.

With the ZIM method however, since it includes an earth ground in a part of the transfer route of the signal, when the size of the transmitter and the receiver is made small in order to improve the portability (and wearability) of the transmitter, the coupling between the transmitter and the earth ground becomes weak, and the communicable distance becomes particularly short. This also means that downsizing of the device is difficult with the ZIM method. In addition, there is another problem in that with a structure including the earth ground in a part of the transfer route of the signal, communication becomes impossible if the human body and the earth ground are brought into contact.

As a similar communication method, there can be mentioned a method introduced by Shigeru Tajima, "Signal Transmission Method", Japanese Patent Application, First Publication, No. Hei 7-170215 (1995) (hereinafter referred to as the "TAJ method"). With this TAJ method, only an electrode of a portion contacting with a human body is disclosed as the electrode of the transmitter and the receiver, and a structure using an earth ground is not explicitly described.

In order to perform communication using an electrostatic field induced in a human body, it is necessary to form two signal routes between a transmitter and a receiver. With the abovementioned ZIM method, the human body and the earth ground correspond to the signal routes respectively, and the existence of electrodes to connect the respective signal routes and the transmitter and the receiver is explicitly described. With the structure of a device according to the TAJ method however, there is a description showing the electrode for connection of the signal route between the transmitter-receiver and the human body, but the electrode for connection of the other signal route is not explicitly described. Hence, the two signal routes are not established, resulting in a weak coupling between the transmitter and the receiver. Thus stable communication is not performed. Namely, the TAJ method shows the possibility of communication, but it is essential to use an earth ground in order to perform good communication in a practical use. Moreover it is also described in an example in the abovementioned Japanese Patent Application publication, that good communication can be performed only when an earth ground is positively used. Furthermore, with the TAJ method, since the conductive portion of the electrode on the human body side is brought into direct contact with the human body, a metal material is in direct contact with the human body. There is thus a problem in that the human body may be badly affected (due to metal allergy and the like).

In view of the above situation, it is an object of the present invention to provide a near-field data communication device which is ultra small and capable of operation with low power.

Furthermore, it is another object of the present invention to provide a technique capable of performing communication even with a small transmitter.

Moreover, it is an object of the present invention to provide a technique capable of performing stable communication without depending upon the relationship between the human body and the earth ground, for example, a technique capable of performing communication even in a state where the human body is in contact with the earth ground.

In addition, an other object of the present invention is to provide a technique which can reduce the size of modulator and demodulator devices and suppress the consumed power.

Furthermore, an other object of the present invention is to provide a technique which can increase the output voltage with only a minimal increase in power consumption, by selecting a suitable choke coil and an LC resonator.

An other object of the present invention is to provide a technique which can perform multiple communications using the same carrier frequency by means of superposed identification numbers.

Furthermore, an other object of the present invention is to provide a technique which can transmit and receive a signal from a shock sensor mounted on the human body even in a state where a human body is in contact with the earth ground, without weakening the coupling between the transmitter and the receiver even if the transmitter of a full-time wearable input device is small.

SUMMARY OF THE INVENTION

The present invention comprises a transmission device having a signal source for outputting a time varying signal, a modulation device for modulating a signal from the signal source using a carrier frequency of from several tens of KHz to several MHz, a transmission B electrode connected to an output from the modulation device and arranged in the vicinity of a human body surface, and a transmission G electrode connected to a reference voltage of the transmission device and arranged toward an external side with respect to the human body, and a reception device having a reception B electrode arranged in the vicinity of the human body surface in the vicinity of the transmission device, a reception G electrode connected to a reference voltage of the reception device and arranged toward an external side with respect to the human body so as to be coupled with the transmission G electrode via air, an amplifying device for amplifying a voltage between the reception B electrode and the reception G electrode, and a demodulation device connected to an output from the amplifying device for demodulating a signal output from the signal source.

Therefore, according to the present invention, the transmission B electrode and the reception B electrode are coupled via a human body by means of a human-body induced electric field, and the transmission G electrode and the reception B electrode are coupled via the air. Hence, due to the formation of two absolute signal routes, communication become possible with quite low electric power, and also the size of the transmission device and the reception device can be made small. That is, by coupling one of the signal transmission routes directly via air, the strength of coupling between the transmission device and the reception device can be improved, and stable communication is made possible. In particular, even if the transmission device is small, the coupling between the transmission device and the reception device is not weakened, and even in a state where the human body is in contact with the earth ground, stable communication can be performed.

Furthermore, the present invention comprises: a transmission device having a signal source for outputting a time varying signal, a first modulation device for modulating a signal from the signal source using a first carrier frequency set in advance, a first transmission B electrode connected to an output from the first modulation device and arranged in the vicinity of a human body surface, and a first transmission G electrode connected to a reference voltage of the transmission device and arranged toward an external side with respect to the human body; a relay device comprising a receiving section having a first reception B electrode arranged in the vicinity of the human body surface in the vicinity of the transmission device, a first reception G electrode connected to a reference voltage of the receiving section and arranged toward an external side with respect to the human body so as to be coupled with the first transmission G electrode via air, and a first demodulation device for demodulating a signal of a voltage between the first reception B electrode and first reception G electrode using the first carrier frequency, and a transmitting section having a second modulation device for modulating a signal output from the receiving section using a second carrier frequency set in advance differently from the first carrier frequency, connected to the receiving section, a second transmission B electrode connected to the output from the second modulation device and arranged in the vicinity of the human body surface, and a second transmission G electrode connected to the reference voltage of the transmitting section and arranged toward an external side with respect to the human body; and a reception device having a second reception B electrode arranged in the vicinity of the human body surface in the vicinity of the relay device, a second reception G electrode connected to the reference voltage of the receiving section and arranged toward an external side with respect to the human body so as to be coupled with the second transmission G electrode via air, and a second demodulation device for demodulating a signal of a voltage between the second reception B electrode and second reception G electrode using the second carrier frequency, wherein the signal from the signal source is transmitted between the transmission device and the relay device using the first carrier frequency, and then transmitted between the relay device and the reception device using the second carrier frequency, thereby performing communication over a long distance which cannot be attained with a single combination of a transmission device and a reception device.

That is, according to the present invention, the communication-possible distance can be extended by retransmitting a signal once received by using another carrier frequency. Furthermore, by repeating such retransmission, the communication-possible distance can be further extended.

Moreover, the present invention comprises: a transmission device of a shape which can be mounted on a wrist or a finger, and having an identification information generating device for generating identification information set in advance, a modulation device for modulating a signal from the identification information generating device using a carrier frequency set in advance, a transmission B electrode connected to an output from the modulation device and arranged in the vicinity of a human body surface, and a transmission G electrode connected to a reference voltage of the transmission device and arranged toward an external side with respect to the human body, and a reception device having a reception B electrode arranged in the vicinity of the human body surface in the vicinity of the transmission device, a reception G electrode connected to a reference voltage of the reception device and arranged toward an external side with respect to the human body so as to be coupled with the transmission G electrode via air, a demodulation device for demodulating a signal of a voltage between the reception B electrode and reception G electrode using the carrier frequency, and a comparison device for comparing the output signal from the demodulation device and identification information inherent in the reception device, wherein the reception device is provided in a predetermined gate mechanism, the reception B electrode is arranged on a surface of the gate mechanism, the reception G electrode is arranged on the surface of the gate mechanism in the vicinity of the reception B electrode, and further comprising a switching device for switching the gate mechanism in response to the output from the comparison device, wherein the portion of the human body where the transmission device is mounted is brought into contact with or close to the reception B electrode or the reception G electrode, to thereby switch the gate mechanism.

Furthermore, the present invention is an information transfer device forming a part of a full-time wearable input unit which performs input of information by typing any physical object with finger-tip of one or more fingers, and comprises: a transmission device comprising a group of transmitters mounted on the base of each finger, the transmitters having, respectively, a shock detection device for detecting shocks generated and transmitted through the finger when the fingertip of the finger on which the transmitter is mounted, strikes the physical surface, a modulation device for modulating a frequency at the output from the shock detection device by using a carrier frequency of from several tens of KHz to several MHz which is different for each finger, a transmission B electrode connected to an output from the modulation device and arranged in the vicinity of the skin surface of the finger base, and a transmission G electrode connected to a reference voltage of the transmitters and arranged on a back side of the finger base, which transmits the output from the shock detection device for each finger via a human body; and a reception device mounted in the vicinity of the wrist of a hand on which the transmitting device is mounted, having a reception B electrode arranged in the vicinity of the skin surface near the wrist, a reception G electrode arranged on an upper face of the wrist so as to be coupled with the transmission G electrode for each finger via air and connected to a reference voltage of the reception device, an amplifying device for amplifying a voltage between the reception B electrode and the reception G electrode, a group of demodulation devices connected to an output from the amplifying device for discriminating a frequency modulation wave transmitted from respective transmitters for each finger depending upon the difference of the carrier frequency for each finger and demodulating the output from the respective shock detection device, a group of typing detection devices for detecting the presence or absence of finger-tip typing by each finger by judging the presence or absence of a specific frequency component of from around 80 to 100 Hz contained in the output signal from the shock detection device of each finger, and a symbol determination device for determining a symbol to be output according to the combination of the typing timing for each finger.

As described above, by arranging a transmitter and a finger-tip typing-detecting sensor on each finger and arranging a reception device on a wrist, the timing of the finger-tip typing (action) performed by using a fingertip on any supported object can be detected without the need of wiring between fingers and the wrist, and commands and characters can be output by a symbol determined based on the typing timing.

BRIEF DESCRIPTION OF THE DRAWINGS

FIG. 31 is a diagram showing one example of a "chord pattern"—"key code" table used in determination of a key code KCD7 in the seventh embodiment.

DESCRIPTION OF THE PREFERRED EMBODIMENTS

First Embodiment
(Basic structure and operating principle)

Figure 1:
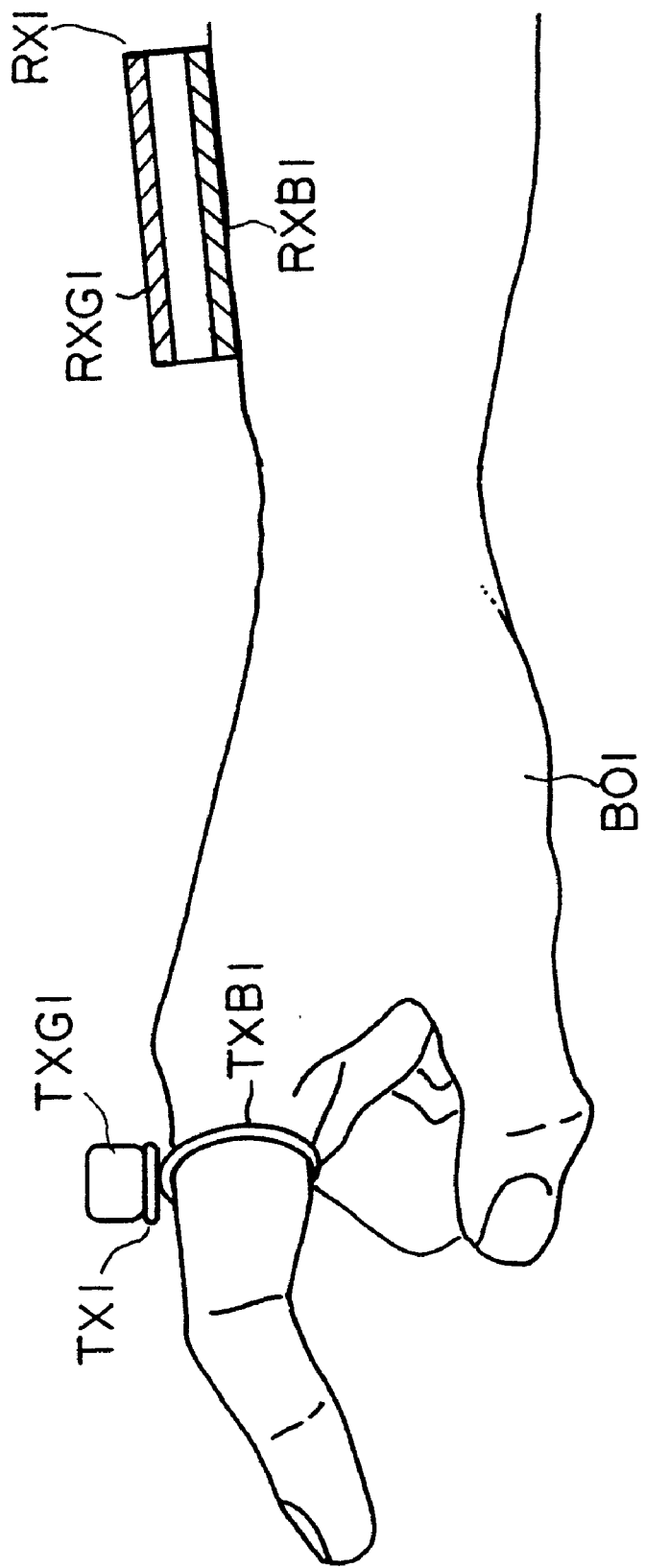
FIG. 1 is a view showing the appearance of an intra-body information transfer device according to a first embodiment of the present invention.

The embodiments of the present invention will now be described with reference to the drawings. First, the basic structure and operating principle of the intra-body information transfer device according to the present invention will be described by taking as an example an embodiment where the device is mounted on a finger and a wrist. FIG. 1 is view showing the appearance of an intra-body information transfer device according to this embodiment, and FIG. 2 is a block diagram showing an internal structure thereof (the embodiment for illustrating the basic structure and operating principle thereof is designated as the first embodiment for the sake of convenience).

Figure 2:
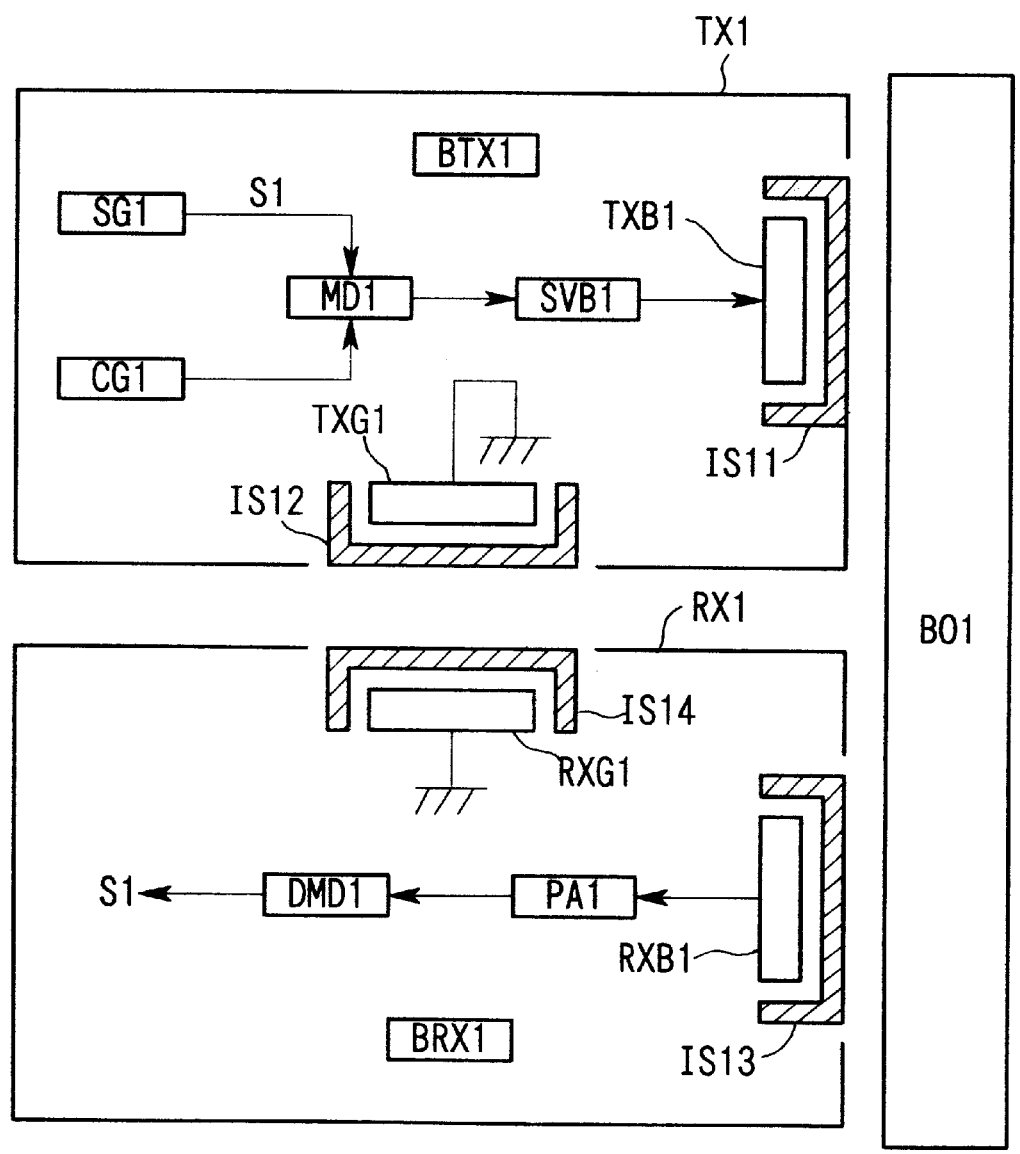
FIG. 2 is a block diagram showing an internal structure of the intra-body information transfer device of FIG. 1.

In FIG. 1 and FIG. 2, BO1 is a human body. TX1 is a transmitter which includes therein, a signal generator SG1, a carrier oscillator CG1, a modulator MD1, a voltage amplifier SVB1, and a battery BTX1. On the human body side of the transmitter TX1 (on the lower face of the case), a transmission B electrode TXB1 molded from an insulating material IS12 is provided, while on the external side of the transmitter TX1 which is opposite to the human body (on the upper and upper-side face of the case), a transmission G electrode TXG1 molded from an insulating material IS12 is provided. With this embodiment, the transmitter TX1 is composed of a ring shape portion mountable as a ring and a case attached to a part of the outer peripheral face thereof, and is mounted and used as shown in FIG. 1. The transmission B electrode TXB1 on the human body side of the transmitter TX1 is formed by utilizing the ring shape portion on the lower side of the case, and the transmission G electrode TXG1 on the external side is formed by utilizing the case.

On the other hand, RX1 is a receiver, which includes therein a preamplifier PA1, a demodulator DMD1 and a battery BRX1. On the human body side of the receiver RX1 (on the lower face of the case), a reception B electrode RXB1 molded from an insulating material IS13 is provided, while on the external side of the receiver RX1 which is opposite to the human body (on the upper face of the case), a reception G electrode RXG1 molded from an insulating material IS14 is provided. With this embodiment, the receiver RX1 is a type installable on the upper face of a wrist (a watch type or a bracelet type), and is installed and used as shown in FIG. 1. The reception B electrode RXB1 of this receiver RX1 is provided on the human body side of the case (on the lower face in FIG. 1), and the reception G electrode RXG1 is provided on the external side (on the upper face in FIG. 1).

The modulator MD1 of the transmitter TX1 uses a carrier of from several tens of KHz to several MHz generated by the carrier generator CG1 to modulate a time varying signal S1 generated by the signal generator SG1. This modulated signal is amplified by the voltage amplifier SVB1, and supplied to the transmission B electrode TXB1 installed in the vicinity of the human body.

Furthermore, the transmission G electrode TXG1 installed facing away from the human body, is connected at a position being a reference voltage of the transmitter TX1. As the reference voltage of the transmitter TX1, for example, a negative source, a positive source, or a reference voltage in an analog circuit ($V_{REF}$) may be used instead of a signal ground.

The preamplifier PA1 of the receiver RX1 amplifies the voltage between the reception B electrode RXB1 arranged in the vicinity of the human body and the reception G electrode RXG1 installed facing away from the human body, and outputs this to a demodulator DMD1. Here, the reception G electrode RXG1 is connected to a position being a reference voltage of the receiver RX1. As the reference voltage of the receiver RX1, for example, a negative source, a positive source, or a reference voltage in an analog circuit ($V_{REF}$) may be used instead of a signal ground. The demodulator DMD1 demodulates a signal output from the preamplifier PA1 (the amplified voltage described above). Hence, the signal S1 generated by the signal generator SG1 of the transmitter TX1 is demodulated in the receiver RX1.

Incidentally, the abovementioned transmitter TX1 and receiver RX1 are operated by independent batteries BTX1 and BRX1, respectively. In addition, since each electrode of the transmitter TX1 and the receiver RX1 is covered with insulating materials IS11, IS12, IS13 and IS14, respectively, conductive materials such as metals are not exposed to the outside.

Figure 3:
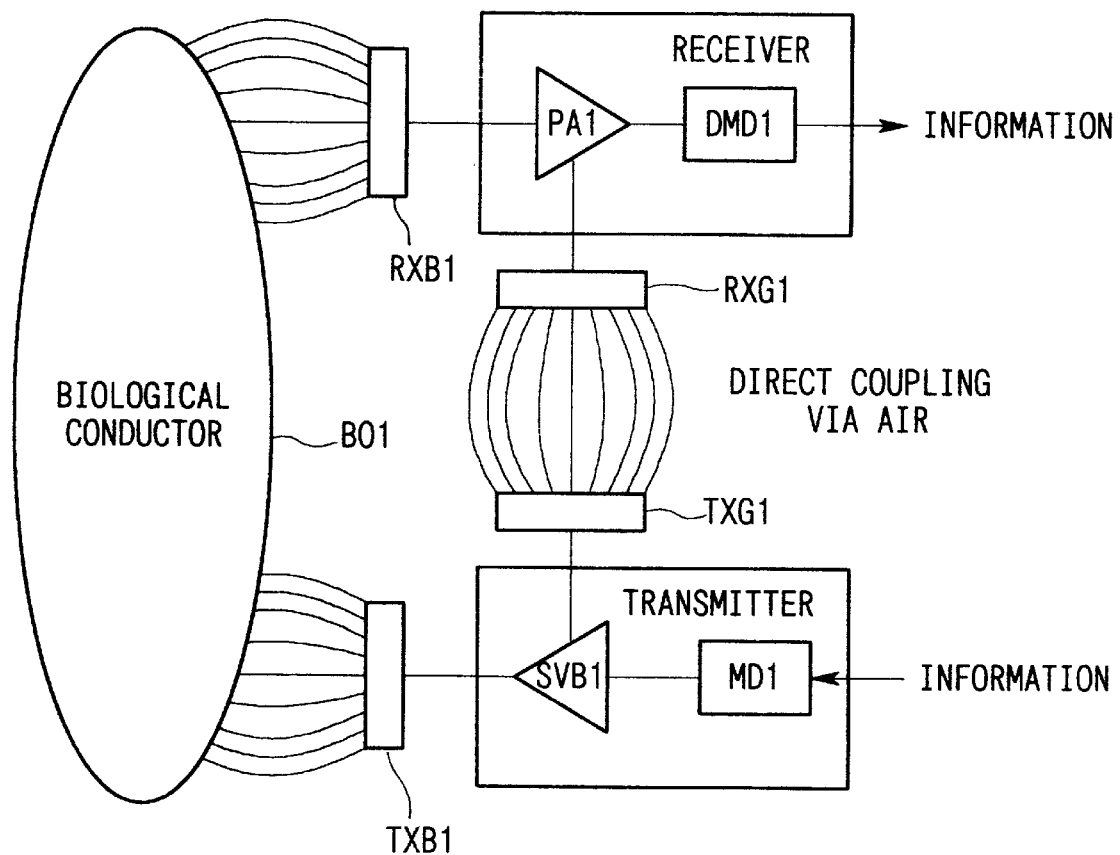
FIG. 3 is a diagram illustrating the operating principle in the first embodiment.

Next, the operating principle according to the above structure will be described. FIG. 3 is a diagram showing the operating principle of this embodiment. In FIG. 3, elements corresponding to the structural elements in FIG. 1 and FIG. 2 described above are denoted by the same reference numerals.

Referring to the transmitter TX1, the signal modulated by the modulator MD1 is amplified by the voltage amplifier SVB1 and supplied to the transmission B electrode TXB1. Hence, a high-frequency potential is applied to the transmission B electrode TXB1 arranged in the vicinity of the human body, and an induced electric field is generated according to the high-frequency potential applied to the human body surface. This induced electrostatic field is then transmitted via the human body BO1, as shown in FIG. 3, and picked up by another electrode arranged in the vicinity of the human body (the reception B electrode RXB1). Thus, the B electrodes of the transmitter and the receiver (the transmission B electrode TXB1 and the reception B electrode RXB1; denoted similarly hereunder) are coupled via the human body.

However, the coupling between the transmitter and the receiver is not performed only with this. That is, in order to transmit the "potential difference" corresponding to the high-frequency voltage to be transmitted from the transmitter TX1 to the receiver RX1, it is necessary to transmit a potential serving as a reference to the receiver TX1 by using another route different from the human body.

For that purpose, the G electrodes of the transmitter and the receiver (transmission G electrode TXG1 and reception G electrode RXGl; denoted similarly hereunder) exist. As described above, the B electrodes of the transmitter and the receiver are coupled via the human body BO1, while the G electrodes are coupled directly via air, as shown in the figure. In this way, the potential serving as a reference is transmitted to the receiver RX1 and the "potential difference" corresponding to the high-frequency voltage to be transmitted is transmitted from the transmitter TX1 to the receiver RX1.

In order to establish this communication method, it is required that the G electrodes of the transmitter and the receiver are arranged in some proximity. That is, as described in the above embodiment, it is required that the reference voltage electrode on the transmitter side and the reference voltage electrode on the receiver side are located in some proximity so that they can be coupled directly via air. The maximum communicationpossible distance in this case depends upon the applied voltage, the size of the electrode plate, the sensitivity of the amplifier and the like, but in general, it is in the range of from several cm to 30 cm.

In addition, the receiver may be in a shape which is mountable on a finger of a human body like the abovementioned transmitter TX1, and the transmitter may be in a shape which is mountable on a wrist of a human body like the abovementioned receiver RX1. Thus the position on which the transmitter and the receiver are mounted may be reversed.

Here, the difference between the communication method in the intra-body communication device according to the present invention and other communication methods "using a human body as the transmission route of a signal" will be described. The ZIM method introduced in the column of the related art described above is similar to the present invention in that a high-frequency modulated signal is transmitted to the human body. However, a part of the signal transmission route is different.

Figure 4:
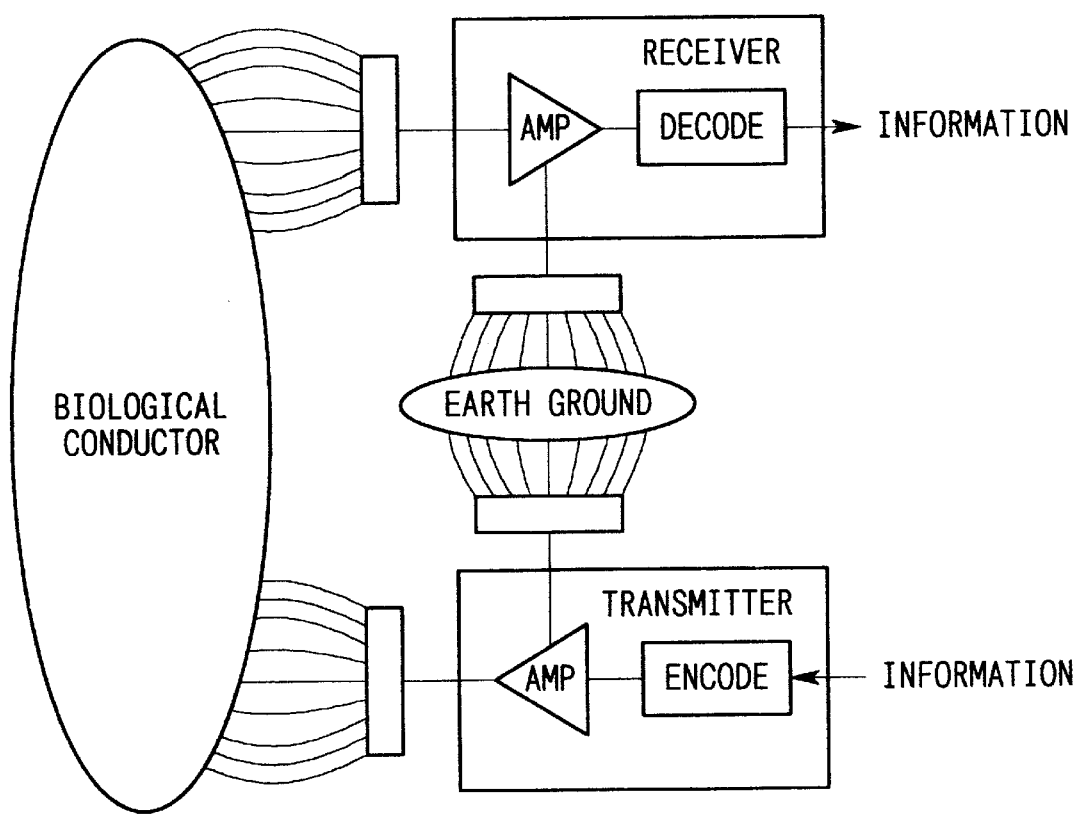
FIG. 4 is a diagram of the communication system using the ZIM method.

FIG. 4 shows a diagram of the communication system using the ZIM method. This is excerpted from, "Thomas G.

Zimmerman: "Personal Area Networks: Near-Field Intrabody Communication", IBM Systems Journal, Vol. 35, No 3&4, 1996". As shown in FIG. 4, with the ZIM method, the transmitter and the receiver are connected by means of two routes; a human body described as a "Biological Conductor", and "Earth Ground".

On the contrary, with the present invention the routes for connecting the transmitter and the receiver are different. That is, in the abovementioned FIG. 3, a communication method according to the present invention is shown using the same form as in FIG. 4. However, as is seen from these figures, with the present invention, of the routes connecting the transmitter and the receiver, the one being the human body BO1 corresponds to the "Biological Conductor", and this is similar, however the other route being "Direct Coupling via air" and the "Earth Ground" is not included.

Figure 5:
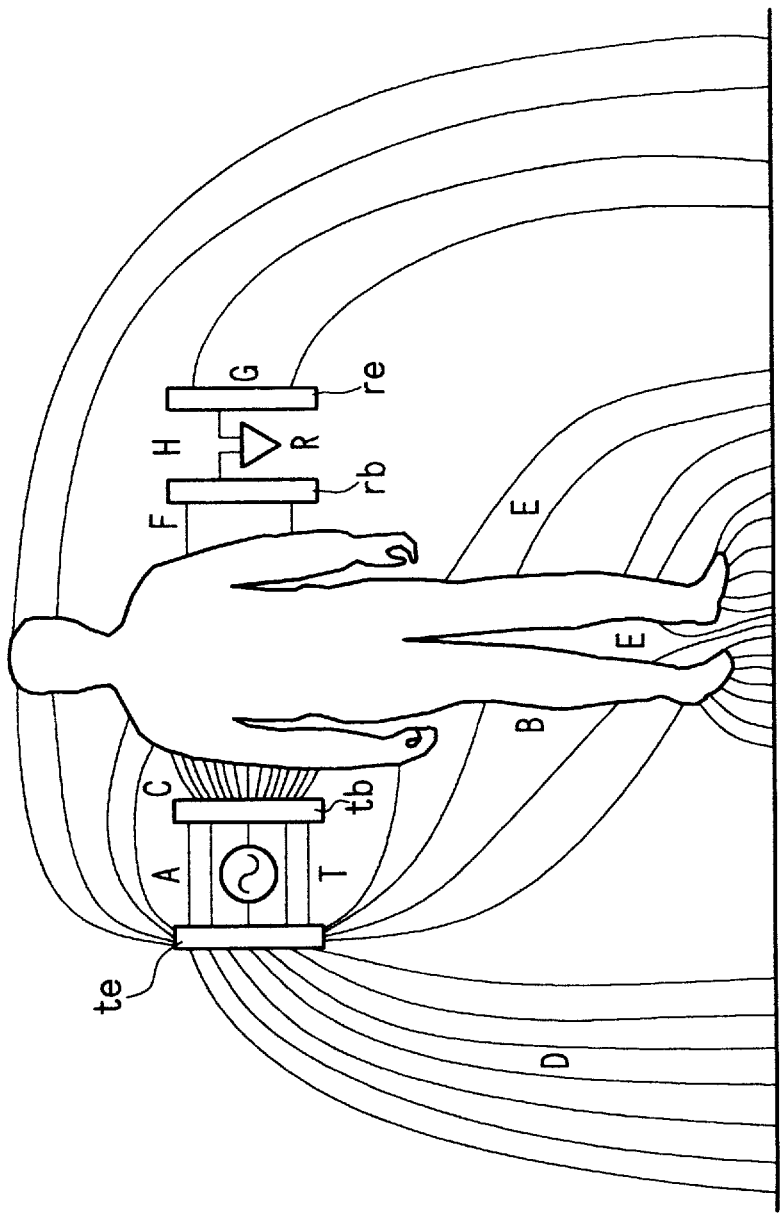
FIG. 5 is a diagram of the communication system using the ZIM method expressed in another form to that of FIG. 4.

FIG. 5 is a diagram of the communication system using the ZIM method expressed in another form. In this figure, 'tb' is an electrode on the human body side of the transmitter, 'te' is another electrode of the transmitter, which is facing away from the human body, 'rb' is an electrode on the human body side of the receiver, and 're' is another electrode of the receiver, which is facing away from the human body. These electrodes correspond respectively to the transmission G electrode TXG1, the transmission B electrode TXB1, the reception G electrode RXG1 and the reception B electrode RXB1 in the above first embodiment of the present invention. As shown in the figures, it can be seen that with the ZIM method, direct coupling of the electrode 'te' and the electrode 're' does not exist, and the system structure is such that these electrodes are coupled via the earth ground (shown by a bold line in the figure).

Figure 6:
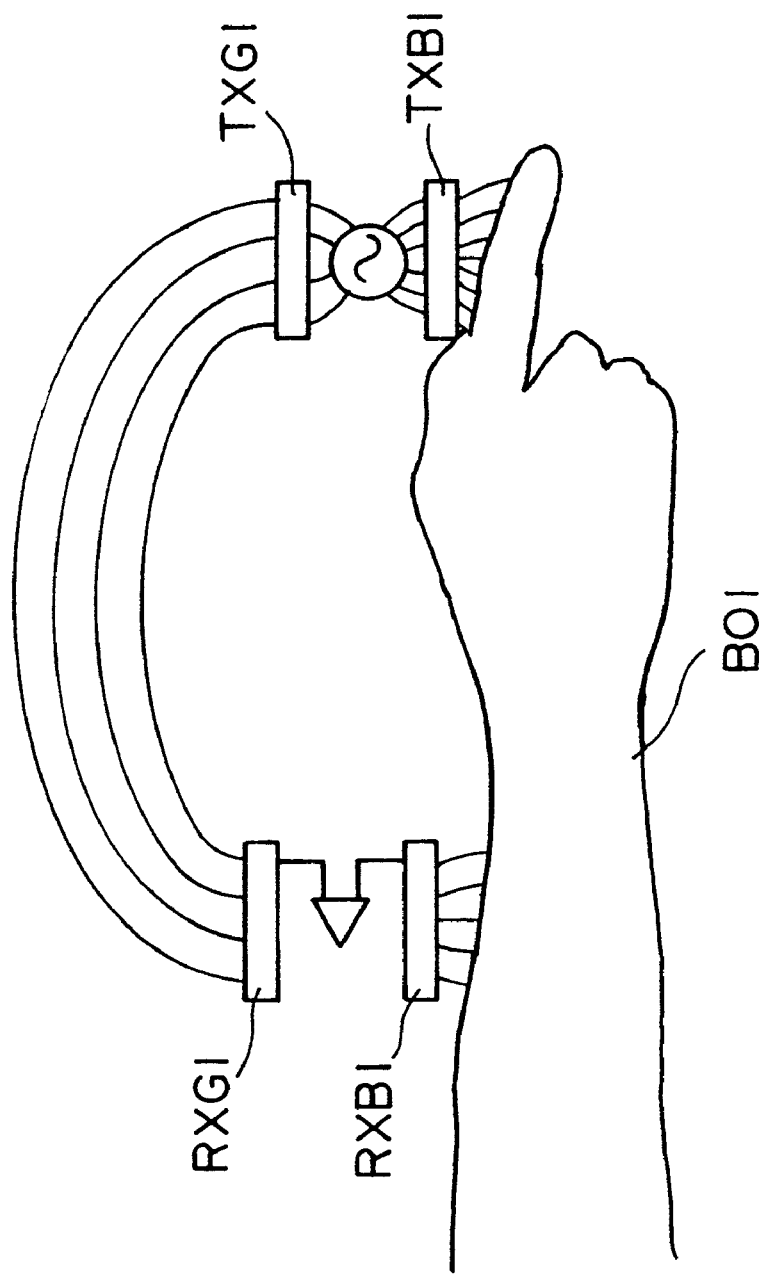
FIG. 6 is a diagram showing the communication system of the present invention expressed diagramatically in the same form as in FIG. 5

FIG. 6 is a diagram showing the communication system of the present invention expressed diagramatically in the same form as FIG. 5. As is shown in FIG. 6, with the present invention, the electrodes of the transmitter and the receiver, which are facing away from the human body ("TXG1" and "RXG1"), and which are coupled directly, and it is seen that the earth ground is not included in this route. That is, with the ZIM method, the earth ground is an essential component as a part of the signal transmission route, whereas with the present invention, the earth ground is not an essential component.

Next, the significance of the difference between the two will be described. The communication system using the ZIM method shown in the diagram of FIG. 5 is established "in principle". However, as a practical problem, when the transmitter and the receiver are installed in a place apart from the earth ground, as is shown in this figure, the degree of coupling between the electrode 'te' of the transmitter, which is facing away from the human body and the earth ground (reference numerals 'D' in the figures) and the degree of coupling between the electrode 're' of the receiver, which is facing away from the human body and the earth ground (reference numerals 'G' in the figures) are weakened greatly.

In such a case, as a method to perform stable communication, there are the following methods:
increasing the transmission power (increasing the voltage amplitude);
increasing coupling to the earth ground by making the electrodes of the transmitter and the receiver, which are facing away from the human body large.

The method involving increasing the transmission power however leads to an increase of power consumption. In addition, the method involving making the electrodes large inevitably results in the size of the devices becoming large. In general, with portable (wearable) devices in which the power consumption must be small and the device itself must small and light, the increase in power consumption and the increase in the size becomes unacceptable. Therefore, unless these problems are solved, the communication system according to the ZIM method cannot be put into practical use.

On the contrary, with the present invention, the earth ground is not included in the signal transmission route. Hence, even if the transmitter and the receiver are installed in a position facing away from the earth ground, stable communication can be performed without the need to increase the transmission power or to make the electrodes large.

Figure 7:
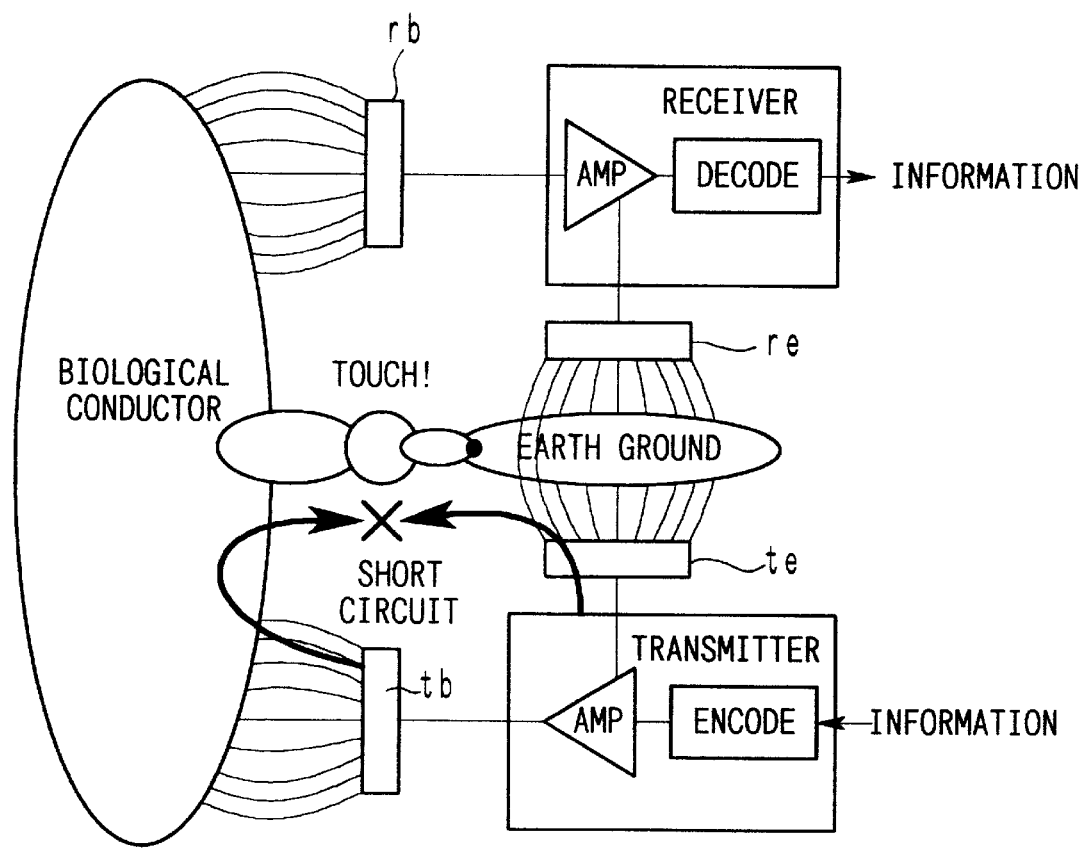
FIG. 7 is a diagram showing a short-circuit state when a human body and an earth ground are brought into contact in the ZIM method.

Furthermore, as another problem with the ZIM method, there can be mentioned the "incapability of communication at the time of contact of the human body and the earth ground". With the ZIM method, the human body and the earth ground are used as a pair of signal transmission routes. Hence, as shown in FIG. 7, when the human body and the earth ground are brought into contact, the circuit becomes a short-circuit state, and the communication cannot be performed. In the abovementioned literature, it is mentioned that when a human body touches the earth ground with bare feet, the reception sensitivity deteriorates by 12 dB.

Considering the actual case of daily life with the device mounted on the body, there are many occasions where a desk or a wall surface are touched with bare hands. Objects such as a desk, a wall surface and the like are in general considered to be an earth ground. Therefore, with the ZIM method in which the abovementioned problems are caused on contact with the earth ground, it is at present difficult to realize a portable (wearable) communication device which can be used in daily life.

On the contrary, with the present invention, since an earth ground is not included in the signal transmission route, the signal transmission route is secured even if a human body touches an earth ground. Hence, stable communication can be performed even if a human body touches an earth ground, and a communication device suitable for portable (wearable) use in daily life can be realized.

As described above, the present invention provides a practical communication device which avoids the problems with the ZIM method, and which enables power consumption reduction, lightening and miniaturisation, and maintenance of stable communication, which is not possible with the ZIM method.

On the other hand, the TAJ method introduced in the column of the related art described above is for transferring data such as video signals and audio signals between a transmitter and a receiver by providing "conductive members exposed to the outside" in the transmitter and the receiver, and bringing a human body into contact with the relevant part (for example, bringing the right hand into contact with the transmitter and the left hand with the receiver).

In the literature in which this TAJ method is described (Japanese Patent Application, First Publication, No. Hei 7-170215 (1995)), it is described that the "conductive members exposed to the outside" are provided for contact with a "human body" for both the transmitter and the receiver. Therefore, it can be said that the "conductive members exposed to the outside" in the literature correspond to the transmission B electrode TXB in the abovementioned first embodiment and the electrode 'tb' in the ZIM method.

In the literature, however, the existence of the electrodes on the GND side of the transmitter and the receiver corresponding to the "G electrodes" in the present invention is not explicitly disclosed. Without this, the signal transmission route cannot be formed. With regard to this point, in the literature, the only description is as described below:

In the case of a battery connection, the coupling of the ground portion on the transmitter side and the receiver side is performed by an "electrostatic magnetic field in air".

In the case of an AC adapter connection, this is performed by a "ground loop using a commercial source".

Figure 8:
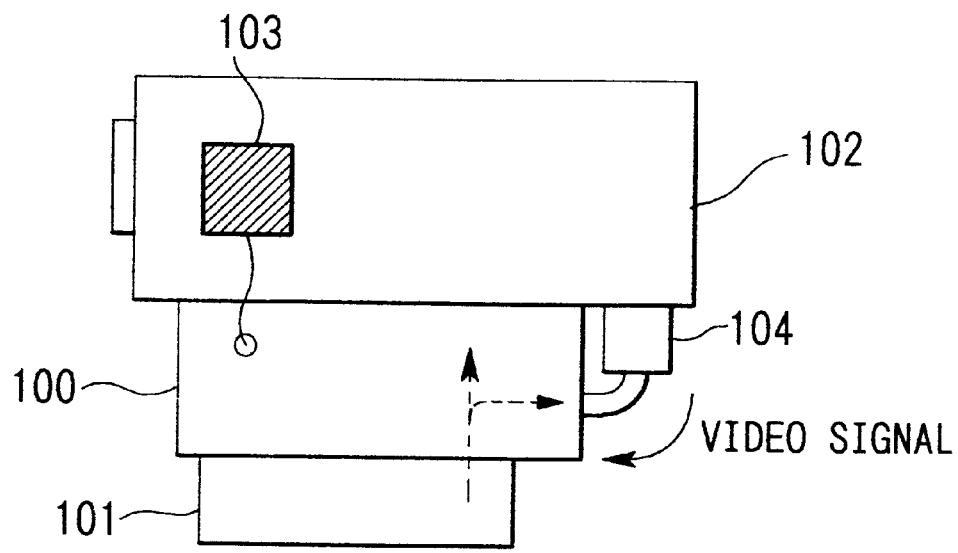
FIG. 8 is a diagram showing the structure when a battery is connected in the TAJ method.
Figure 9:
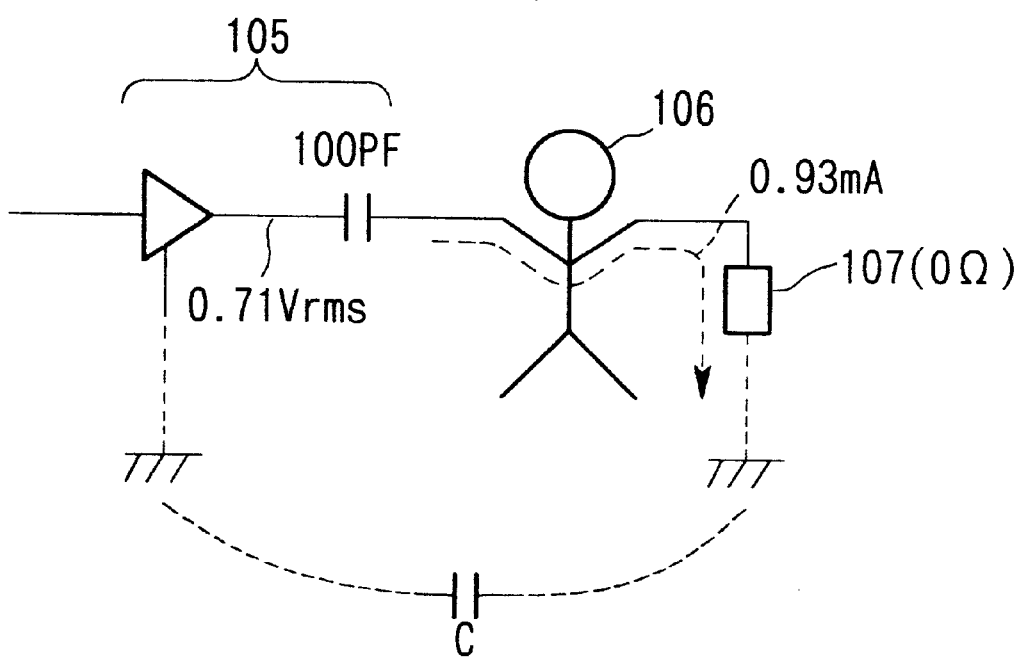
FIG. 9 is a diagram showing the manner in which a signal is transmitted via a human body in the TAJ method.

Drawings excerpted from the literature are shown in FIG. 8 and FIG. 9. FIG. 8 shows the case of the battery connection. Reference numeral 100 denotes a transmission device, 101 denotes a battery source, 102 denotes a signal selection circuit, 103 denotes an electrode ("a conductive member exposed to the outside"), and 104 denotes a camera connector. In addition, FIG. 9 shows the manner in which a signal is transmitted via a human body. Reference numeral 105 denotes an amplifying circuit, 106 denotes a human body and 107 denotes a load. As shown in these figures, in the literature, the electrodes on the GND side corresponding to the "G electrode" in the present invention are not shown, and there is only a description that a signal transmission route is formed by an electrostatic magnetic field. That is, in the TAJ method, the importance of the electrodes on the GND side is not recognized when the signal transmission route is formed by an electrostatic magnetic field in air, and the actual structure for forming the signal transmission route is not considered technically.

With the communication method using direct coupling in air between electrodes on the GND side, the degree of coupling (distance, arrangement, size and the like) between the electrodes on the GND side (the G electrodes of the present invention) is more important for the communication distance and stability of the communication than the degree of coupling between the electrodes on the human body side (the B electrodes of the present invention) and the human body, which involves for example the size, the contact state and the like of the electrode on the human body side. Therefore, the existence of the "G electrodes" of the transmitter and the receiver (electrodes on the GND side) is very important for the establishment of direct coupling in air, and with the TAJ method which lacks the "G electrodes" (electrodes on the GND side), stable communication is difficult to perform. As a description supporting this fact, in the beforementioned literature, it is described that good communication could only be performed when an earth ground was used (in the case of an operation using an AC adapter; that is, in the case similar to the abovementioned ZIM method).

As described above, it can be said that the present invention has an advantage over the TAJ method in that "G electrodes" are provided at a close position so as to be directly coupled via air so as to always secure a signal transmission route. Incidentally, the "G electrodes" are not necessarily the same as the signal ground potential of the transmitter and the receiver, and may be a stabilized signal line which can be a reference voltage within the circuit of the transmitter and the receiver (for example, positive or negative source voltage, or a reference voltage in an analog circuit ($V_{REF}$)).

Furthermore, with the TAJ method, the electrodes formed by "conductive members" are "exposed to the outside", and are in direct contact with the human body. The conductive members contain metal ions, in general, and when an object containing a metal ion is brought into contact with the skin for a long time, a metal allergy may be caused. On the contrary, with the present invention, all electrodes are covered with an insulating material. Hence there is no risk that a metal allergy is caused even if they are mounted on the body for a long time. In addition, since there is no need to bring the electrodes on the human body side into contact with the human body directly, the degree of freedom regarding the installation of the transmitter and the receiver is improved. Furthermore, since the electric current flowing to the human body is a high frequency of the order of from microamperes to picoamperes, there is no influence to the human body.

Incidentally, with the TAJ method, the latter one using a "commercial source" is similar to that of the ZIM method using an earth ground, and the relevance to the present invention is small.

With the above first embodiment, even in the case where the transmission B electrode TXB1 of the transmitter TX1 is connected to the reference voltage, and the transmission G electrode TXG1 thereof is connected the voltage amplifier SVB1, a similar function to the abovementioned transmitter TX1 can be realized. Furthermore, if the reference voltage of the receiver RX1 is connected to the reception B electrode RXB1 and not to the reception G electrode RXG1, a similar function to that of the abovementioned receiver RX1 can be realized. Thus, the point to be connected with the B electrodes and G electrodes of the transmitter and the receiver can be independently changed. Therefore, by having a structure where the connection of each electrode can be changed in a number of combinations, and then changing the combination manually or automatically, it is possible to select a combination having the least influence from outside noise. Furthermore, since the combinations of connections of B electrodes and G electrodes of the transmitter and the receiver can be optionally selected, the degree of freedom in the design of the transmitter and the receiver is improved.

Second Embodiment (ID superposition)

Figure 10:
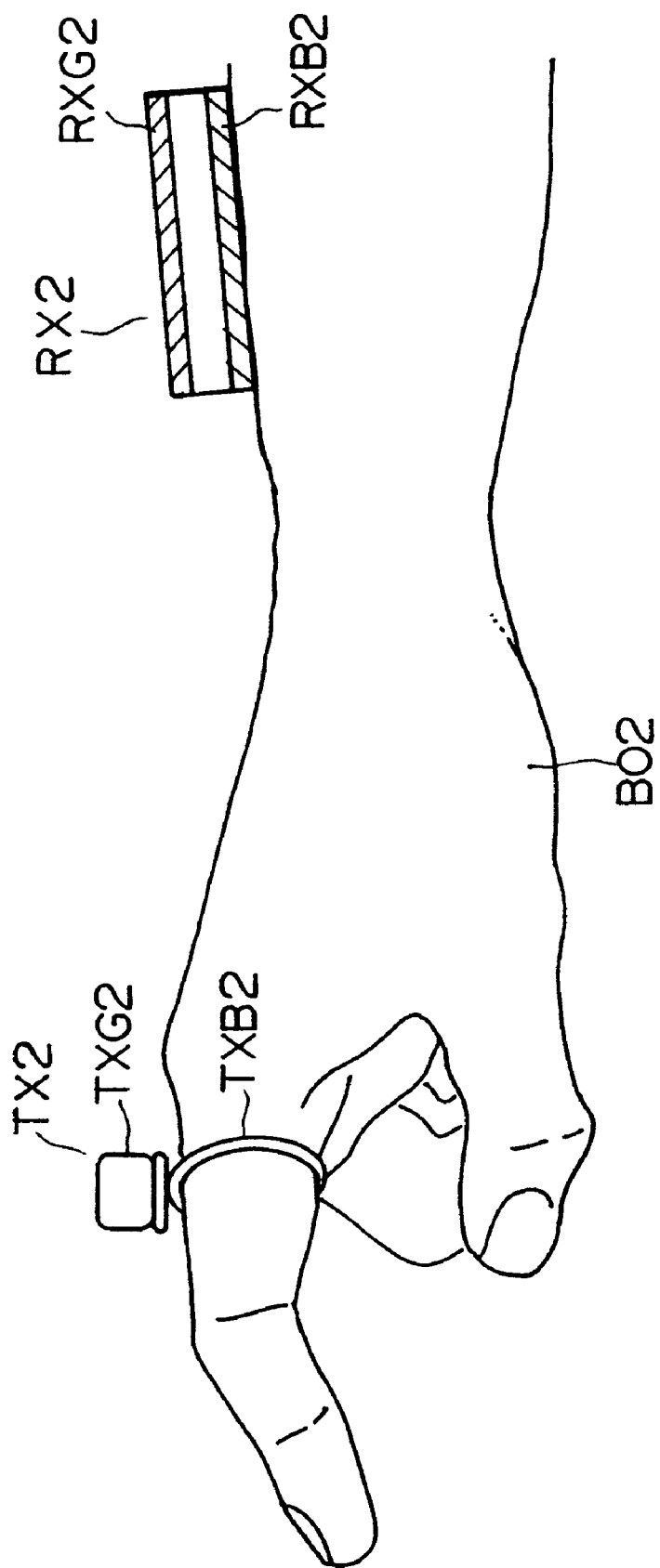
FIG. 10 is a diagram showing the appearance of an intra-body information transfer device according to a second embodiment of the present invention.
Figure 11:
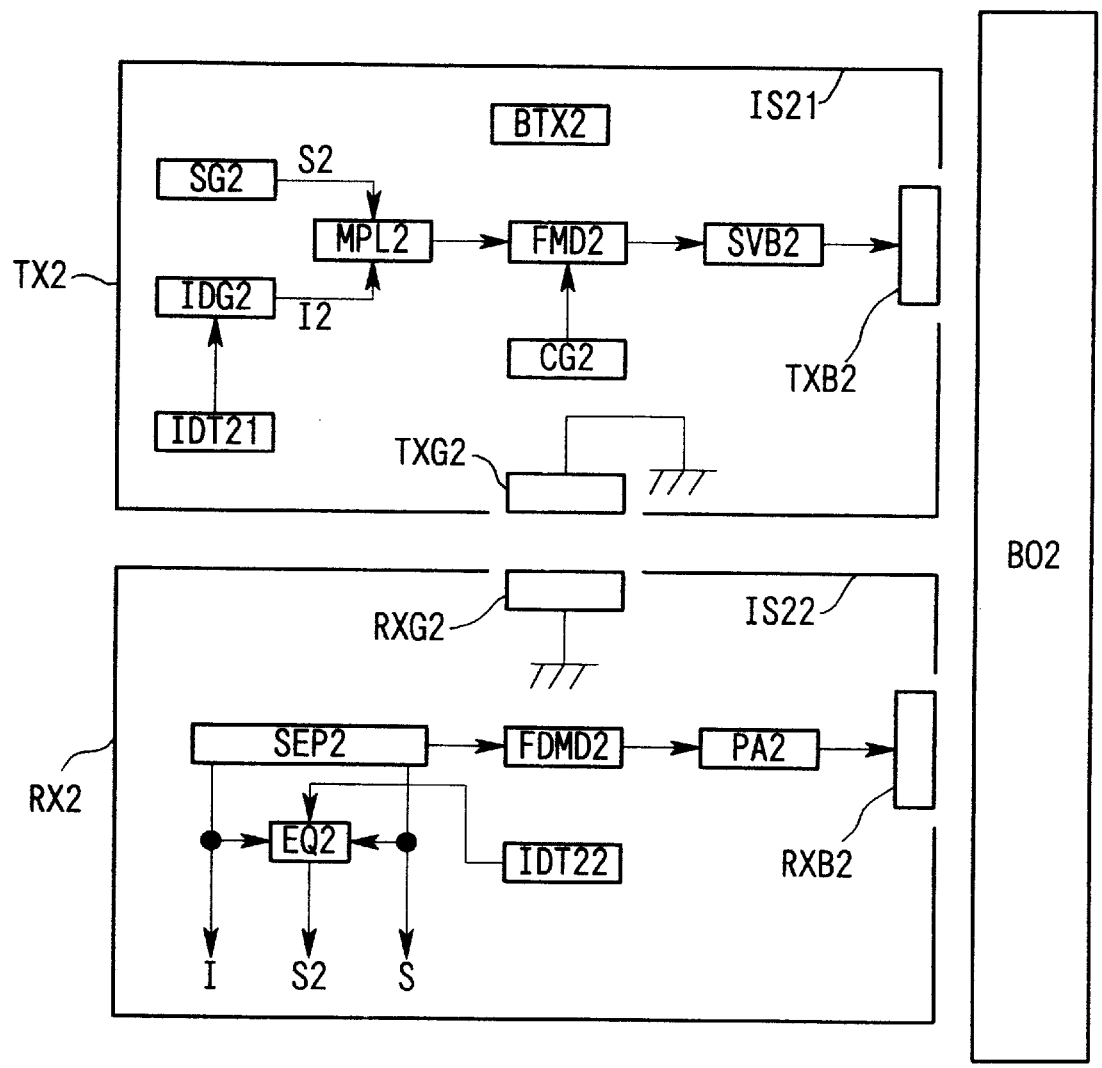
FIG. 11 is a block diagram showing an internal structure of the intra-body information transfer device of FIG. 10.

A second embodiment in which superposition of ID information (identification information), frequency modulation and voltage amplification are performed will now be described. FIG. 10 is a diagram showing the appearance of an intra-body information transfer device according to this embodiment, while FIG. 11 is a block diagram showing the internal structure thereof. The basic structure and operation (matters relating to coupling between the transmitter and the receiver) of this embodiment are similar to those in the above first embodiment.

Referring to FIG. 10 and FIG. 11, B02 is a human body. TX2 is a transmitter which includes therein a signal generator SG2, an ID table IDT21, an ID generator IDG2, a superposing device MPL2, a carrier oscillator CG2, a FM modulator FMD2, a voltage amplifier SVB2, and a battery BTX2. On the human body side of the transmitter TX2 (on the lower face of the case), a transmission B electrode TXB2 is provided, while on the external side of the transmitter TX2 which is opposite to the human body (on the upper and upper-side face of the case), a transmission G electrode TXG2 is provided. In addition, the outer face of the transmitter TX2 is molded using an insulating material IS21. With this embodiment, the transmitter TX2 is composed of a ring shape portion mountable as a ring and a case attached to a part of the outer peripheral face thereof, and is mounted and used as shown in FIG. 10. The transmission B electrode TXB2 on the human body side of the transmitter TX2 is formed by utilizing the ring shape portion on the lower side of the case, and the transmission G electrode TXG2 on the external side is formed by utilizing the case.

On the other hand, RX2 is a receiver which includes therein a preamplifier PA2, an FM demodulator FDMD2, a separator SEP2, an ID table IDT22, an equivalence judging device EQ2 and a battery BRX2. On the human body side of the receiver RX2 (on the lower face of the case), a reception B electrode RXB2 is provided, while on the external side of the receiver RX2 which is opposite to the human body (on the upper face of the case), a reception G electrode RXG2 is provided. With this embodiment, the receiver RX2 is a type installable on the upper face of a wrist, and is installed and used as shown in FIG. 10. The reception B electrode RXB2 of this receiver RX2 is provided on the human body side of the case (on the lower face in FIG. 10), and the reception B electrode RXB2 is provided on the external side (on the upper face in FIG. 10).

The ID generator IDG2 of the transmitter TX2 generates ID information I2 based on the information written in a rewritable ID table IDT21 and supplies this information to the superposing device MPL2. The superposing device MPL2 superposes the ID information I2 supplied from the ID generator IDG2 on the time varying signal S2 generated by the signal generator SG2, and outputs the superposed signal to the FM modulator FMD2. The FM modulator FMD2 uses a carrier of from several tens of KHz to several MHz generated by the carrier generator CG2 to modulate the frequency of the signal S2 on which the ID information I2 output from the superposing device MPL2 is superposed. This frequency-modulated signal is amplified by the voltage amplifier SVB2 and supplied to the transmission B electrode TXB2 installed in the vicinity of the human body.

Furthermore, the transmission G electrode TXG2 installed facing away from the human body is connected to a position being the reference voltage of the transmitter TX2. As the reference voltage of the transmitter TX2, for example, a negative source, a positive source, or a reference voltage in an analog circuit ($V_{REF}$) may be used instead of a signal ground.

The preamplifier PA2 of the receiver RX2 amplifies the voltage between the reception B electrode RXB2 arranged in the vicinity of the human body and the reception G electrode RXG2 arranged facing away from the human body, and outputs this to an FM demodulator FDMD2. Here, the reception G electrode RXG2 is connected to a position being a reference voltage of the receiver RX2. As the reference voltage of the receiver RX2, for example, a negative source, a positive source, or a reference voltage in an analog circuit ($V_{REF}$) may be used instead of a signal ground.

The FM demodulator FDMD2 demodulates a signal (the amplified voltage described above) output from the preamplifier PA2 and outputs this signal to the separator SEP2. The separator SEP2 picks up the signal S2 generated by the signal generator SG2 of the transmitter TX2 and the ID information I2 generated by the ID generator IDG2 from the demodulated signal from the FM demodulator FDMD2. The picked up ID information I2 is supplied to the equivalence judging device EQ2, and the equivalence judging device EQ2 judges if this is a valid ID or not by comparing with the information in the rewritable ID table IDT22. As a result of this judgement by the equivalence judging device EQ2, if the ID information I2 is confirmed to be a valid ID, the signal S2 is output as a valid signal.

Now, the effect of the use of the ID and the frequency modulation in this embodiment will be described. When a number of these devices are used simultaneously, the use of a different carrier frequency can avoid the interference. However, it is difficult to increase the available channel number without unduly increasing the range of the carrier frequency and without unduly narrowing the band width of the modulation wave.

The frequency modulation has a characteristic in that when a number of modulation waves having the same carrier frequency interfere, only the strong signal is modulated (masking effect). Furthermore, since this device is of a wearable as shown in the figures, the corresponding transmitter-receiver pair may be considered to have been installed in a closer position than other transmitter-receiver pairs. Therefore, according to the characteristic of the frequency modulation and the embodiment of the present invention, even if a number of the devices having the same carrier frequency are used simultaneously, the receiver can easily pick up only the signal from the transmitter in the valid pair.

When the operation of the transmitter in the valid pair is stopped, for example, when the power supply of the transmitter for receiving is cut off, or when the output becomes very weak, there may be the risk of demodulating signals from other transmitters by mistake. Therefore, by superposing a signal of simple ID information on a signal transmitted from each transmitter, the signal from other transmitters having other ID information is not output, even if it is received. Thus, only a signal from a specific transmitter can be selectively received. In addition, stoppage of the transmitter in the valid pair can be found.

Here, as the superposing method for the ID information, frequency division and time division can be considered. Incidentally, the transmission of the ID information need not always be performed, and for example, it may be transmitted with a suitable interval of from several seconds to several minutes. In addition, the ID may be encoded by making the bit rate very slow (for example, less than 1 bps.).

Furthermore, by making the ID in the ID table of the transmitter and the receiver rewritable from the outside, it becomes possible to rewrite this at the time of production or at any time after production, and to use different IDs according to need. Furthermore, in the receiver, by using a structure where permission for operation is given to a number of IDs, permission for use can be given to a specific group.

Specific Examples of Voltage Amplifiers

Figure 12:
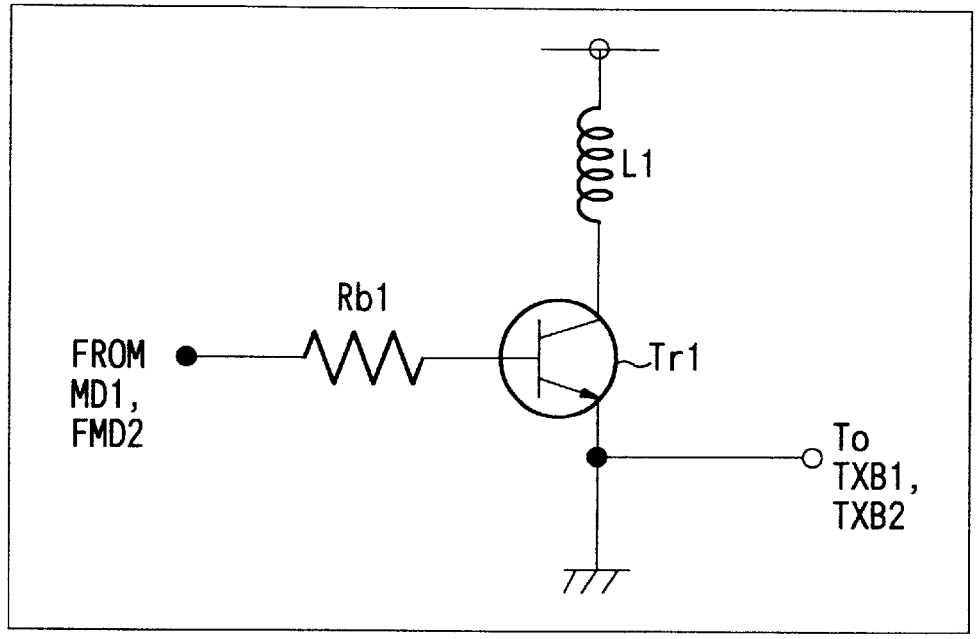
FIG. 12 is a diagram showing one example of a voltage amplifier using a choke coil.

The voltage amplifiers (SVB1, SVB2) in the abovementioned embodiments will now be described. FIG. 12 shows one example of the voltage amplifier using a choke coil. In FIG. 12, Rb1 denotes a resistance for limiting the current, with one end connected to the beforementioned modulator MD1 or an FM modulator FMD2 (hereinafter, simply referred to as a modulator), and the other end connected to a transistor Tr1. The transistor Tr1 is a switching transistor connected to a choke coil L1, which operates in response to a signal from the modulator supplied via the resistance Rb1, and applies the output voltage in which the signal from the modulator is amplified, to the transmission B electrode TXB1 or TXB2.

With such a structure, by selecting a proper choke coil L1 for the carrier frequency, it becomes possible to increase the output voltage several times with only a minimal increase in power consumption. Hence a long communication distance can be ensured.

Figure 13:
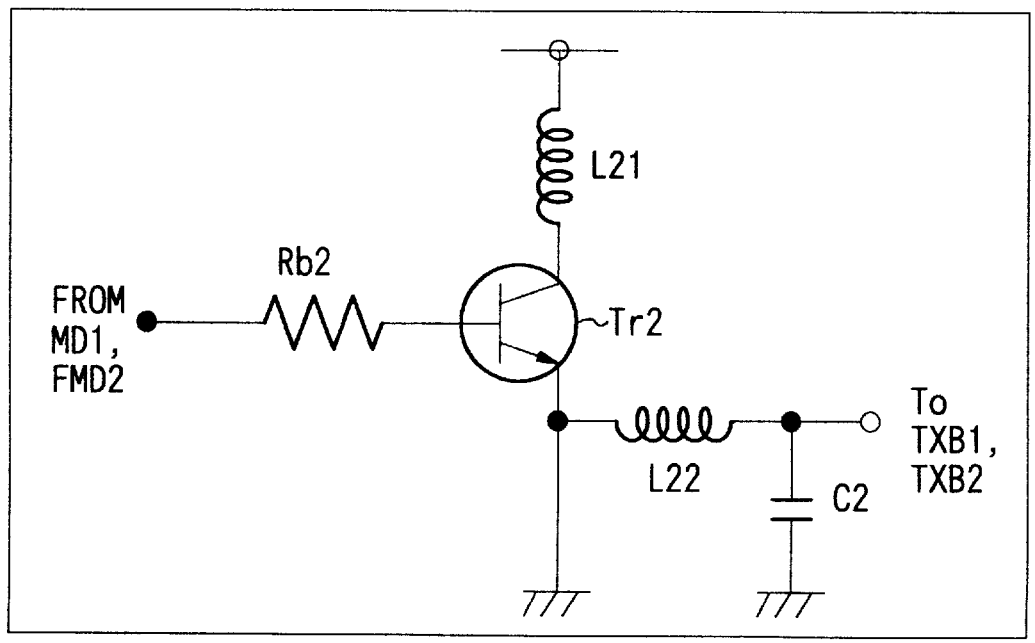
FIG. 13 is a diagram showing one example of a voltage amplifier using a choke coil and an LC resonator comprising a coil and a capacitor.

One example of the voltage amplifier using a choke coil and an LC resonator comprising a coil and a capacitor is shown in FIG. 13. In this figure, Rb2, Tr2 and L21 respectively denote a resistance for limiting the current, a transistor for switching, and a choke coil. L22 and C2 respectively denote a coil and a capacitor constituting the LC resonator, and are connected to the output stage of the transistor Tr2.

Thus, by using together the choke coil L21 and the resonator comprising the coil L22 and the capacitor C2, a larger voltage can be obtained than in the case of using only a choke coil. Hence a longer communication distance can be ensured.

The resonance frequency of the resonator is determined by the coil L22 and the capacitor C2. When this resonance frequency coincides with the carrier frequency, the largest output voltage is obtained. However the power consumption is also increased. In such a case, by staggering the resonance frequency intentionally within a range such that a sufficient output voltage to obtain the intended communication distance can be obtained, then the power consumption can be reduced.

In addition, in the literature in which the abovementioned ZIM method is introduced, it is described that the voltage is amplified by using only a resonator comprising a coil and a capacitor, without using a choke coil. While the voltage amplification is possible by using only such a resonator, the power consumption becomes large. Hence it is not suitable for use where a low power consumption is required as in the ring shape transmitter in the abovementioned embodiment. Therefore, in order to increase the voltage amplitude while maintaining low power consumption, the existence of the choke coil is essential.

Third Embodiment (Mounting Configuration)

Figure 14:
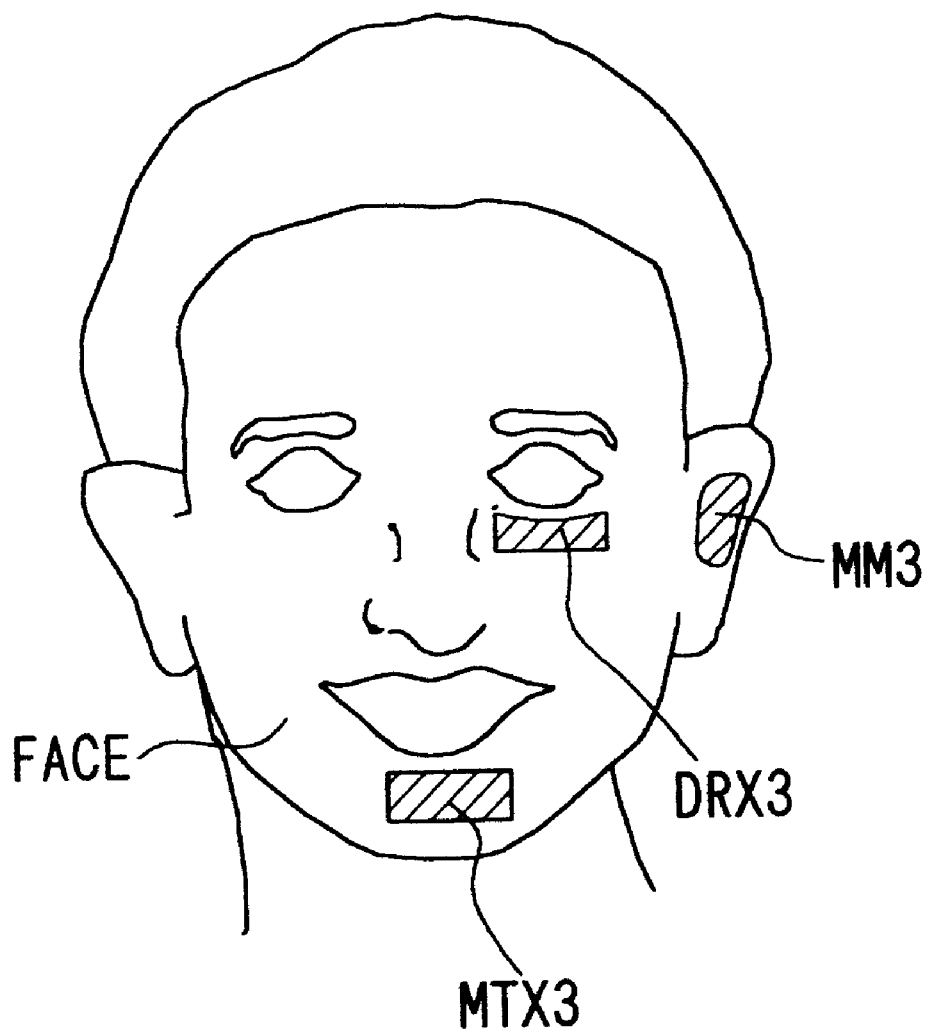
FIG. 14 is a diagram showing an example where a wearable information processing device according to a third embodiment of the present invention, is mounted on a person's face.
Figure 15:
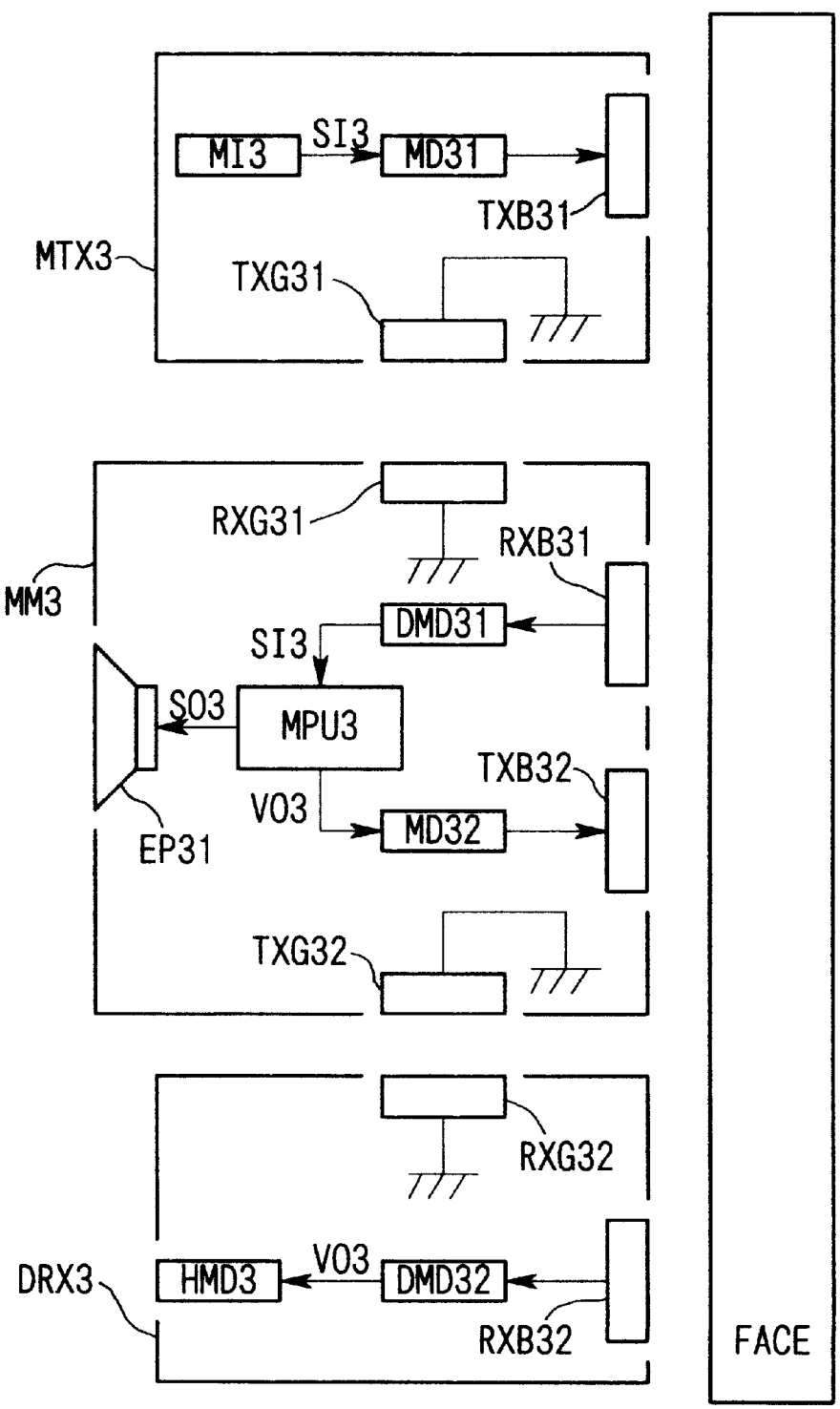
FIG. 15 is a diagram showing an internal structure of the wearable information processing device of FIG. 14.

A third embodiment of the present invention will now be described. FIG. 14 is a diagram showing an example where a wearable information processing device according to this embodiment is mounted on the face of a person (operator), while FIG. 15 is a block diagram showing the internal structure of the wearable information processing device. Incidentally, "FACE" in FIG. 15 means the face of the operator. The input device of this information processing device involves voice input, while the output device involves voice output and image output. In addition, with this embodiment, two pairs of transmitters and receivers are used.

Referring to FIG. 14 and FIG. 15, MTX3 is a microphone unit mounted on the mouth, which modulates a voice signal SI3 of the operator collected by a microphone MI3 with a modulator MD31, and transmits the voice signal via a transmission B electrode TXB31 and a transmission G electrode TXG31. The structure and the operating principle of this signal transmission is similar to for the abovementioned embodiment.

MM3 is an earhole-wearable main unit (of a shape that can be hooked to the ear or inserted into the earhole), and comprises a reception B electrode RXB31 and a reception G electrode RXG31 coupled to the transmission B electrode TXB31 and the transmission G electrode TXG31. In this main unit MM3, the voltage between the reception B electrode RXB31 and the reception G electrode RXG31 is amplified (the amplifier is not shown) and demodulated by a demodulator DMD31, and the obtained voice signal SI3 is sent to a computer MPU3.

The computer MPU3 performs a predetermined processing based on the supplied voice signal SI3, and feeds back the processing result to the operator by means of a voice signal SO3 and an image signal VO3. The voice signal SO3 is output as a voice through an earphone EP31 installed in the earhole. The image signal VO3 is modulated by a modulator MD32, and transmitted through a transmission B electrode TXB32 and a transmission G electrode TXG32. The structure and the operating principle of this signal transmission is also similar to for the abovementioned embodiment.

DRX3 is an image unit of an eyeglasses-type mounted to the eye or in a shape which is mountable in the vicinity of the eyeball, and comprises a reception B electrode RXB32 and a reception G electrode RXG32 coupled to the transmission B electrode TXB32 and the transmission G electrode TXG32. In this image unit DRX3, the voltage between the reception B electrode RXB32 and the reception G electrode RXG32 is amplified (the amplifier is not shown) and demodulated by a demodulator DMD32, and an image based on the obtained image signal SO3 is displayed by means of a head mount display HMD3 of a retina-projection type.

In this case, by making the frequency used in the modulator MD31 and the demodulator DMD31 (from several tens of KHz to several MHz) and the frequency used in the modulator MD32 and the demodulator DMD32 (from several tens of KHz to several MHz) different, simultaneous usage is possible.

Figure 16:
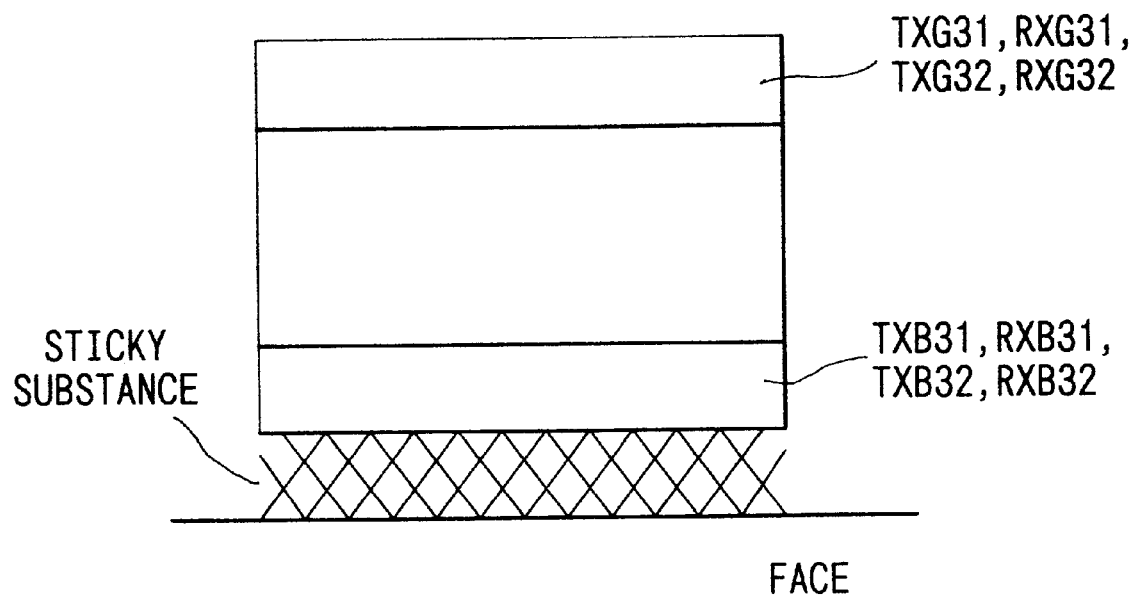
FIG. 16 is a diagram showing an example of how a microphone unit MTX3 is mounted in the third embodiment.

Furthermore, the microphone unit MTX3, the main unit MM3, and the image unit DRX3 are respectively mounted on the face by means of a sticky substance such as a doublesided sticky tape or the like, as shown in FIG. 16.

Hence, communication between modules can be performed without providing a wire between each module installed near the mouth, the ear and the eye. That is to say, even if the devices are installed facing away from the ground, such as on the face and the like, stable communication can be made possible by using a direct coupling method via air according to the present invention. Moreover, by installing the transmitter and the receiver as a ring and a bracelet, or as glasses and an earphone, the advantage of this method (direct coupling between electrodes on the outer side of the human body) can be best realized.

In the literature in which the abovementioned ZIM method is introduced, there is an illustration of devices installed on the face or on the arm. However, with the ZIM method using an earth ground as the signal transmission route, it is difficult to perform stable communication between devices installed on such places (the ZIM method is suitable for the case where the devices are installed close to the ground, such as on the soles of shoes).

Fourth Embodiment (Repeater)

Figure 17:
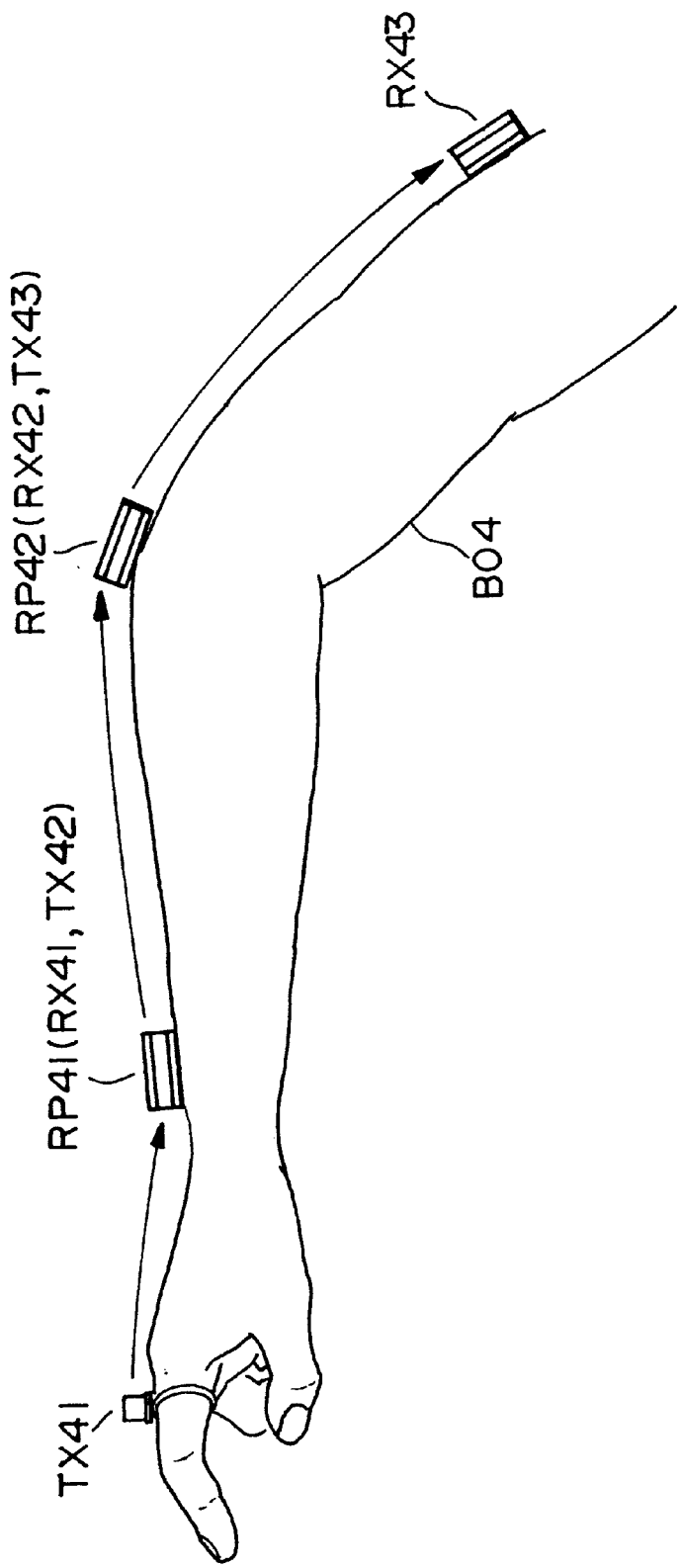
FIG. 17 is a view showing the appearance of an intra-body information transfer device according to a fourth embodiment of the present invention.
Figure 18:
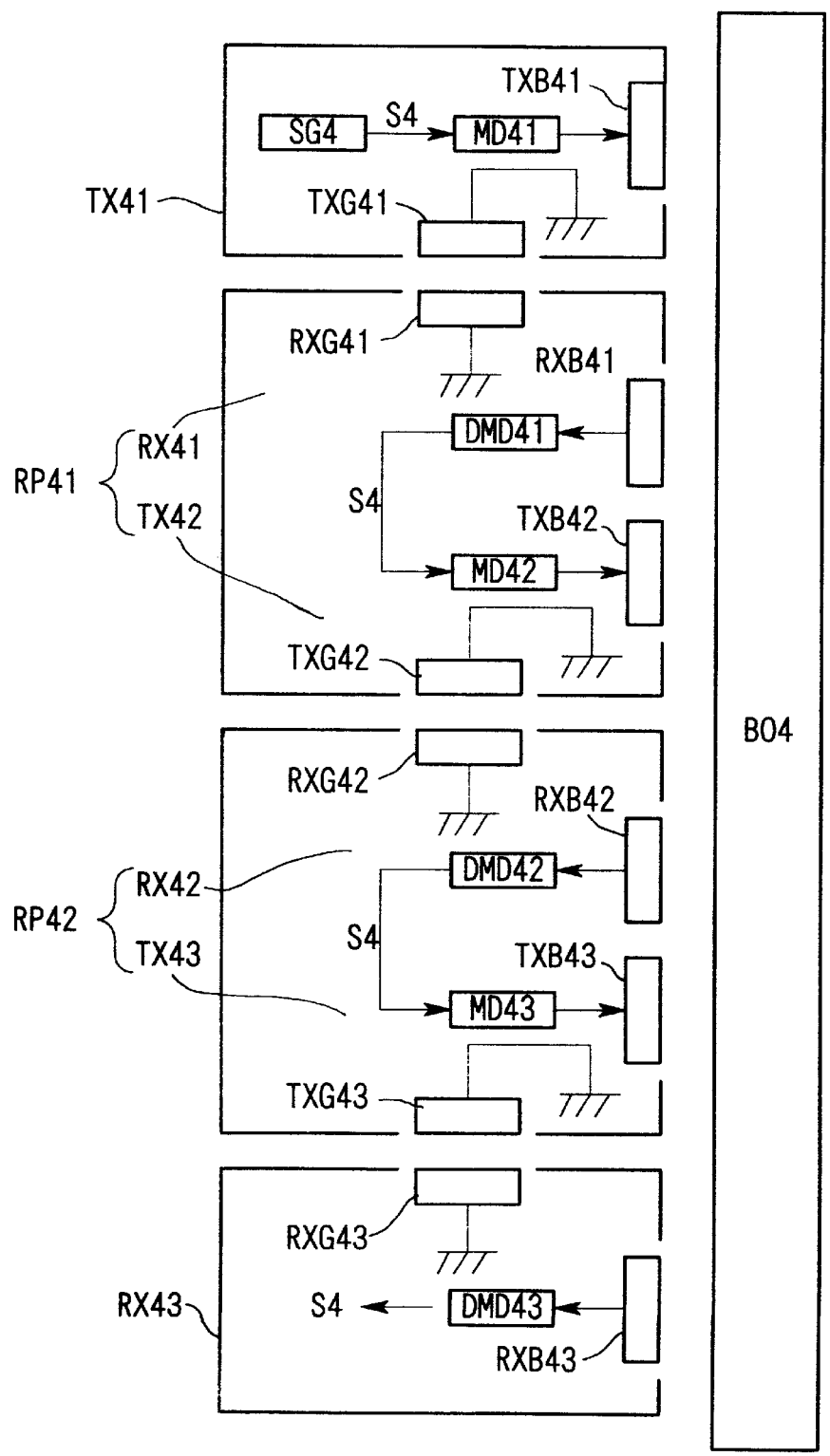
FIG. 18 is a block diagram showing an internal structure of the intra-body information transfer device of FIG. 17.

A fourth embodiment of the present invention which performs long-distance transmission by a combined operation of a number of transmitters and receivers will now be described. FIG. 17 is a diagram showing the appearance of an intra-body information transfer device according to this embodiment. FIG. 18 is a block diagram showing the internal structure thereof. IB04 in FIG. 18 shows a human body (a person's hand and arm is shown in FIG. 17).

Referring to FIG. 17, a transmitter TX41 is mounted on a finger. This transmitter TX41 performs communication according to the communication method of the present invention described above (which is similar for the transmitters and receivers described below). On the wrist is mounted a repeater RP41 including a receiver RX41 corresponding to the transmitter TX41 and a new transmitter TX42. In addition, a repeater RP42 including a receiver RX42 corresponding to the transmitter TX42 and a new transmitter TX43 is mounted on the elbow. Furthermore a receiver RX43 corresponding to the transmitter TX43 is mounted on the shoulder. In this case, the transmitter TX41 and the repeater RP41, and the repeater RP41 and the repeater RP42, and the repeater RP42 and the receiver RX43 are respectively installed within a distance in which direct communication is possible, but the transmitter TX41 and the repeater RP42, and the repeater RP41 and the repeater RX43 are respectively not within a distance capable of direct communication. The transmitter TX41 and the receiver RX43 are installed at a position away from each other by several centimeters to several meters.

Referring to FIG. 17 and FIG. 18, the time varying signal S4 generated in the signal generator SG4 in the transmitter TX41 mounted on a finger is modulated by a modulator MD41 (the modulation frequency is from several tens of KHz to several MHz; and similarly hereunder), and then transmitted via the transmission B electrode TXB41 and the transmission G electrode TXG41. In addition, the transmission G electrode TXG41 is connected to the reference voltage of the transmitter TX41.

The receiver RX41 in the repeater RP41, which includes the reception B electrode RXB41 and the reception G electrode RXG41 respectively coupled to the transmission B electrode TXB41 and the transmission G electrode TXG41, amplifies the voltage between these electrodes (the amplifier is not shown), and demodulates this with a demodulator DMD41. On the other hand, the transmitter TX42 in the repeater RP41 modulates the signal S4 demodulated by the demodulator DMD41 again with the modulator MD42, and transmits this via the transmission B electrode TXB42 and the transmission G electrode TXG42. The receiver RX41 and the transmitter TX42 are of an integral type or are connected by a signal line. In addition, the reception G electrode RXG41 and the transmission G electrode TXG42 are connected respectively to the reference voltage of the receiver RX41 and the transmitter TX42. However, as the reference voltage, the same reference voltage as in the repeater RP41 may be used.

Similarly, the receiver RX42 in the repeater RP42, which includes the reception B electrode RXB42 and the reception G electrode RXG42 respectively coupled to the transmission B electrode TXB42 and the transmission G electrode TXG42, amplifies the voltage between these electrodes (the amplifier is not shown), and demodulates this with a demodulator DMD42. On the other hand, the transmitter TX43 in the repeater RP42 modulates the signal S4 demodulated by the demodulator DMD42 again with the modulator MD43, and transmits this via the transmission B electrode TXB43 and the transmission G electrode TXG43. The receiver RX42 and the transmitter TX43 are of an integral type or are connected by a signal line. In addition, the reception G electrode RXG42 and the transmission G electrode TXG43 are connected respectively to the reference voltage of the receiver RX42 and the transmitter TX43. However, as the reference voltage, the same reference voltage as in the repeater RP42 may be used.

The receiver RX43, which includes the reception B electrode RXB43 and the reception G electrode RXG43 respectively coupled to the transmission B electrode TXB43 and the transmission G electrode TXG43, amplifies the voltage between these electrodes (the amplifier is not shown), and demodulates this with a demodulator DMD43. In this way, with the receiver RX43, the original signal S4 is picked up. In addition, the reception G electrode RXG43 is connected to the reference voltage of the receiver RX43.

As described above, by installing one or more repeater units sequentially, communication becomes possible between the transmitter and the receiver located at a distance within which communication is not possible directly (in this embodiment, between the transmitter TX41 and the receiver RX43). In addition, by increasing the repeater units, the communication distance can be further extended.

Furthermore, in this case, while it is ideal to use different carrier frequencies, as long as there are at least three carrier frequencies, then in principle any number of repeaters can be connected. However, in order to do that, the condition must be satisfied that "all the repeaters are located at a distance within which direct communication is only possible with the adjacent repeaters".

Fifth Embodiment (ID unit)

Figure 19:
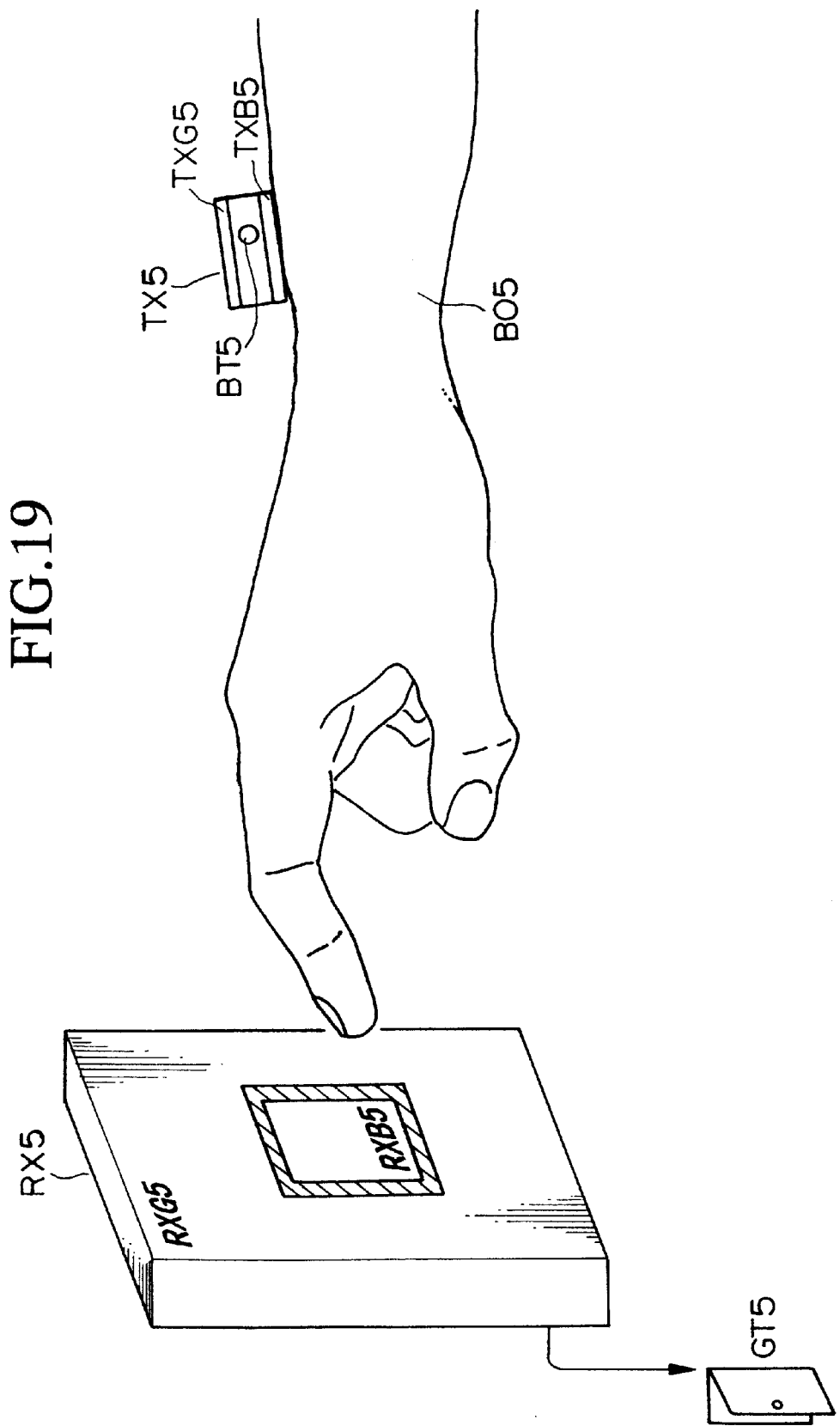
FIG. 19 is a view showing an ID unit according to a fifth embodiment of the present invention.
Figure 20:
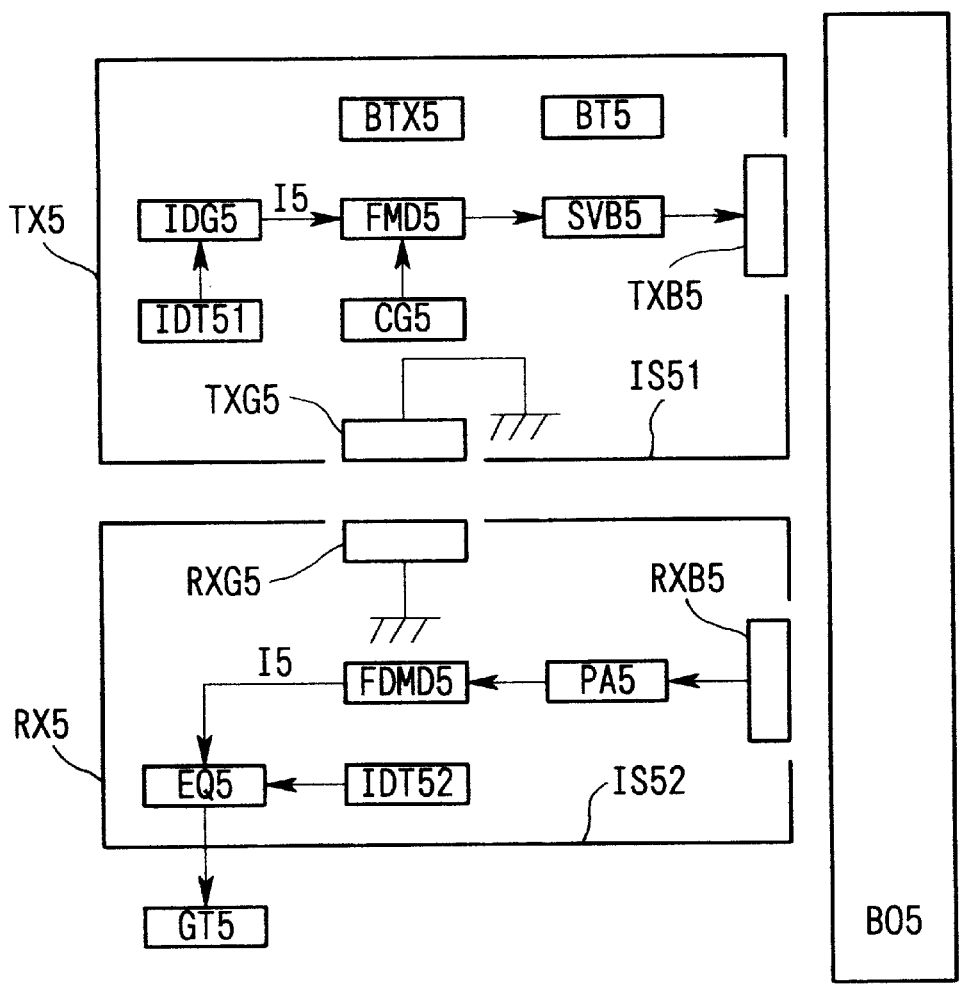
FIG. 20 is a block diagram showing the internal structure of the ID unit of FIG. 19.

Next, a fifth embodiment will be described. FIG. 19 is a view showing an ID unit according to this embodiment, showing an example of a wearable ID sending unit. FIG. 20 is a block diagram showing the internal structure of the ID unit.

In these figures, a biological conductor BO15 is the human body. TX5 is a transmitter which includes therein an ID table IDT51, an ID generator IDG5, a carrier oscillator CG5, an FM modulator FMD5, a voltage amplifier SVB5, a battery BTX5 and a button switch BT5. On the human body side of the transmitter TX5 (on the lower face of the case), a transmission B electrode TXB5 is provided, while on the external side of the transmitter TX5 which is opposite to the human body (on the upper face of the case), a transmission G electrode TXG5 is provided. In addition, the outer face of the transmitter TX5 is molded using an insulating material IS51. With this embodiment, the transmitter TX5 is of a type mountable on the upper face of a wrist, and is installed as shown in FIG. 19. Communication is performed by touching the electrode on the wall on the receiver RX5 side (described later) with a finger. The transmission B electrode TXB5 of this transmitter TX5 is provided on the human body side of the case (on the lower face in FIG. 19), while the transmission G electrode TXG5 is provided on the external side (on the upper face in FIG. 19).

On the other hand, the receiver RX5 is installed in a structure such as a wall or a column, or in a gate mechanism such as a door, a barrier, a vehicle door or the like (hereinafter, simply referred to as a gate mechanism), and includes therein a preamplifier PA5, an FM modulator FMMD5, an ID table IDT52, and an equivalence judging device EQ5. With regard to the electrode on the wall, a reception B electrode RXB5 is installed in the central portion and a reception G electrode RXG5 is installed in the surrounding portion. The space between these electrodes is insulated, and the surfaces of both electrodes are molded by an insulating material.

The ID generator IDG5 of the transmitter TX5 generates ID information I5 based on the information written in the rewritable ID table IDT5. The frequency of the ID information I5 is modulated in the FM modulator FMD5 using a carrier (of from several tens of KHz to several MHz) generated by the carrier generator CG5. This modulated signal is amplified by the voltage amplifier SVB5 and supplied to the transmission B electrode TXB5 installed in the vicinity of the human body.

Furthermore, the transmission G electrode TXG5 installed facing away from the human body is connected to a position being the reference voltage of the transmitter TX5. As the reference voltage of the transmitter TX5, for example, a negative source, a positive source, or a reference voltage in an analog circuit ($V_{REF}$) may be used instead of a signal ground.

The preamplifier PA5 of the receiver RX5 amplifies the voltage between the reception B electrode RXB5 arranged in the central portion and the reception G electrode RXG5 arranged in the surrounding portion, and outputs this to the FM demodulator FDMD5. Here, either of the reception G electrode RXG5 or the reception B electrode RXB5 is connected to a position being a reference voltage of the receiver RX5. However, in FIG. 20, the case where the reception G electrode RXG5 is connected to the position being a reference voltage is shown as an example. As the reference voltage of the receiver RX5, for example, a negative source, a positive source, or a reference voltage in an analog circuit ($V_{REF}$) may be used instead of a signal ground.

The FM demodulator FDMD5 demodulates a signal output from the preamplifier PA5 and picks up the ID information I5 generated by the ID generator IDG5 of the transmitter TX5. The picked up ID information I5 is supplied to the equivalence judging device EQ5, and the equivalence judging device EQ5 judges if this is a valid ID or not by comparing with the information in the rewritable ID table IDT52. As a result of this judgement by the equivalence judging device EQ5, if the ID information I5 is confirmed to be a valid ID, the gate mechanism GT5 is opened.

In this embodiment, either of the reception G electrode RXG5 or the reception B electrode RXB5 is connected to the reference voltage of the receiver RX5. In this case, the human body may touch either of the reception B electrode RXB or the reception G electrode RXG. However when the human body touches both the reception B electrode RXB and the reception G electrode RXG, communication becomes difficult. Therefore, both electrodes being brought into contact with the human body at the same time is avoided by forming the shape and structure of electrodes and insulating materials appropriately and providing a frame or the like around one electrode.

Figure 21:
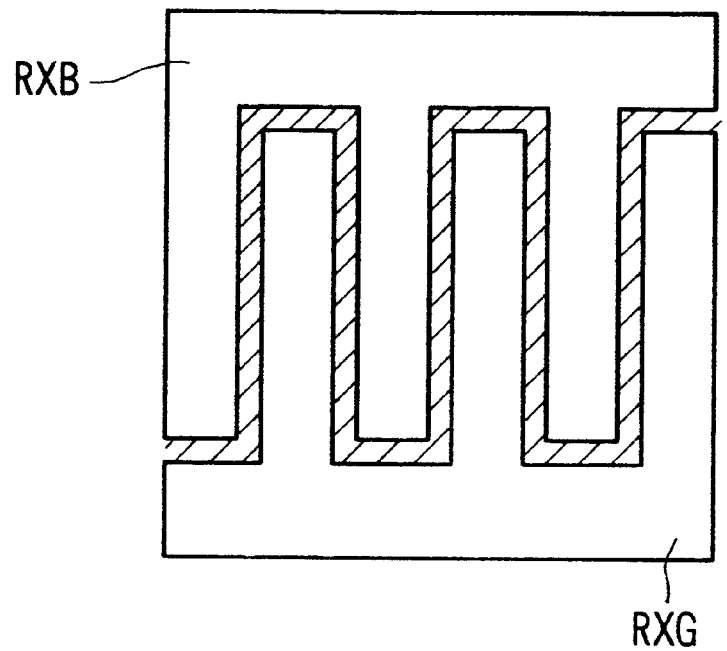
FIG. 21 is a diagram showing an other example of the shape and the structure of an electrode of a receiver.
Figure 22:
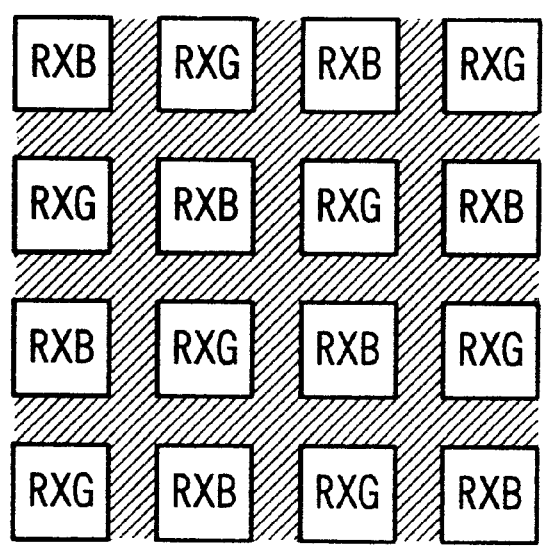
FIG. 22 is a diagram showing an other example of the shape and the structure of an electrode of a receiver.

Hence, for the shape and structure of the electrodes of the receiver RX5, the arrangement shown in FIG. 21 and FIG. 22 may be adopted instead of the arrangement shown in FIG. 19 in which the reception G electrode RXG5 exists around the reception B electrode RXB5 (coaxial type). The electrodes shown in FIG. 21 have such a structure that the reception B electrode RXB5 and the reception G electrode RXG5 are respectively in a comb shape having a one-directional band portion with a number of band portions extending in parallel from the side thereof, and are arranged so that a number of band portions of both electrodes are not overlapped on each other. On the other hand, the electrodes shown in FIG. 22 have such a structure that the reception B electrode RXB5 and the reception G electrode RXG5 are the aggregation of a number of rectangular electrodes respectively, and are arranged so that the same rectangular electrodes are not adjacent to each other horizontally and vertically as shown in the figure.

Figure 23:
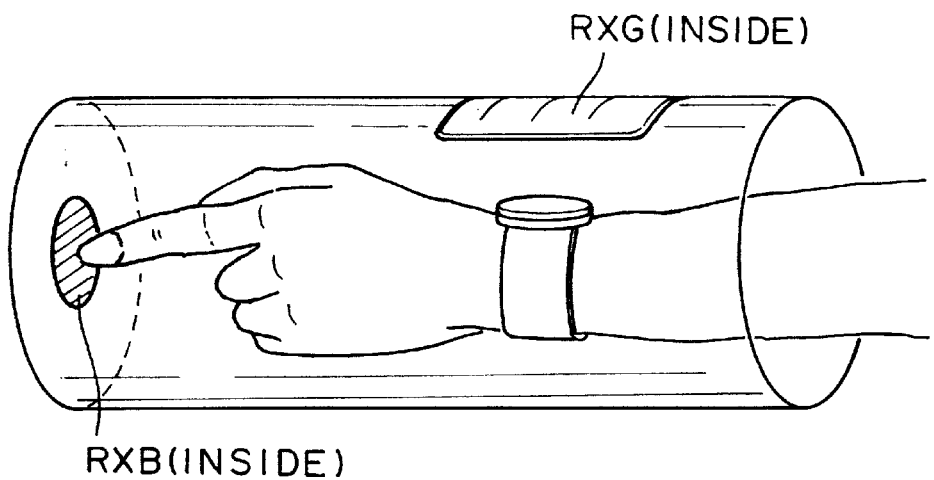
FIG. 23 is a diagram showing an other example of the shape and the structure of the other electrode of the receiver.
Figure 24:
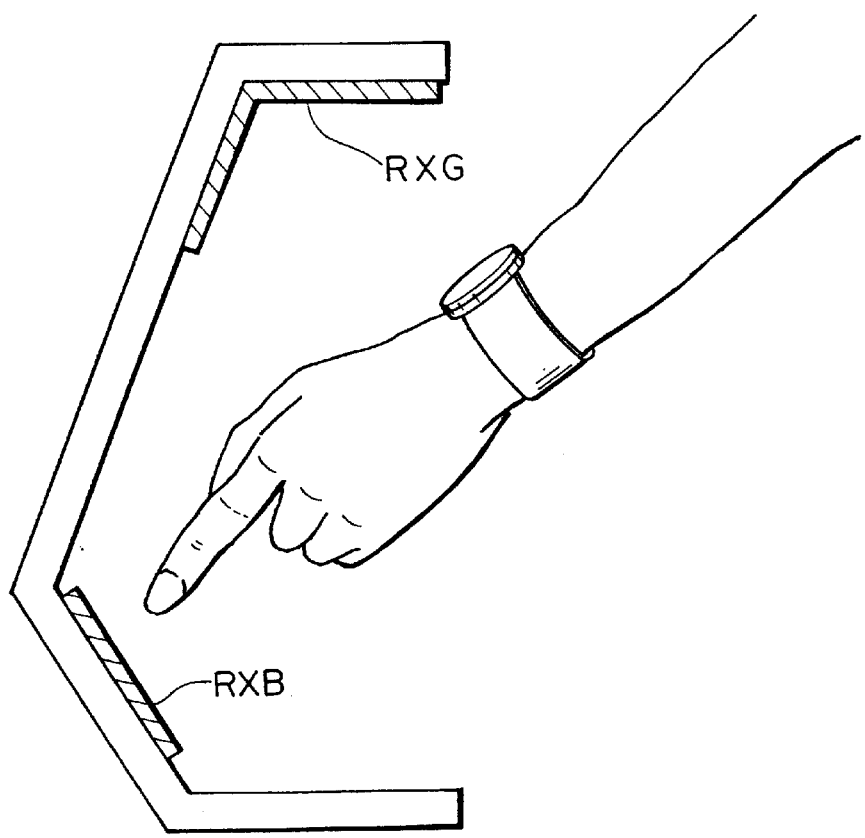
FIG. 24 is a diagram showing an other example of the shape and the structure of the other electrode of the receiver.

Furthermore, the receiver RX5 may have a structure as shown in FIG. 23 and FIG. 24. The receiver RX5 shown in FIG. 23 includes a case having a hollow columnar shape whose one end is open, with the reception B electrode RXB5 provided in the closed other end and the reception G electrode RXG5 provided in a part of an inner side wall. On the other hand, the receiver RX5 shown in FIG. 24 has the reception B electrode RXB5 provided in a part of a substrate having a C-shaped section, and the reception G electrode RXG5 provided at a position covering the reception B electrode RXB5 on the same substrate. With the receiver RX5 having such a structure, when the human body touches the reception B electrode RXB5, the reception G electrode RXG5 comes close to the transmission G electrode IXG5, and hence the data transfer can be performed more securely.

In addition, it is not always necessary that the human body touches the reception B electrode RXB5 in order to perform communication by this device. The human body has only to come close to the reception B electrode RXB5 so that the coupling between the reception B electrode RXB5 and the transmission B electrode TXB5 is established. However, since the degree of coupling between electrodes is inversely proportional to the square of the distance, this can be set by appropriately setting the threshold of the sensitivity so that the data is transferred only when the human body touches the reception B electrode RXB5. Hence, it becomes clear that the data is transferred by touching.

The structure may be such that the data transfer is not performed always, but is performed for example, only for a certain time after a button switch BT5 provided in the transmitter TX5 is pushed (or after a predetermined command input). Hence, the situation of "extracting personal information" can be made known to users. In addition, such a method is effective from a standpoint of battery life.

Sixth Embodiment

Figure 25:
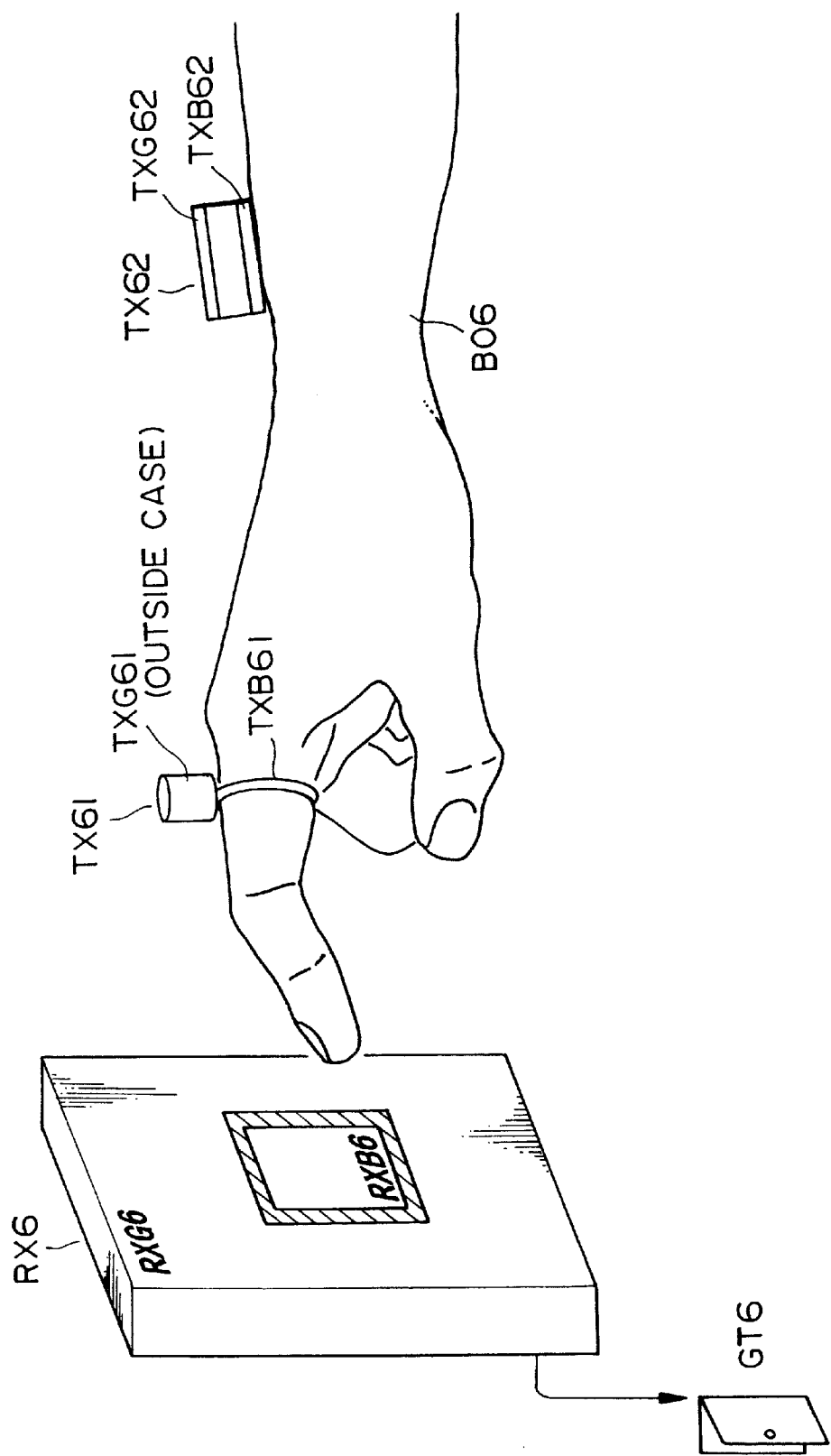
FIG. 25 is a view showing the intra-body information transfer device according to a sixth embodiment of the present invention.

Next, a sixth embodiment will be described in which similar functions are performed by replacing the operation of the abovementioned button switch BT5 with movement of a human body. FIG. 25 is a view showing an intra-body information transfer device according to this embodiment, in which a transmitter TX62 is installed on the wrist and a transmitter TX61 is installed at the base of a finger. The transmitter TX61 and the transmitter TX62 respectively perform communication with a receiver RX6 shown in the figure. For the convenience sake, both of them will be described side by side.

Figure 26:
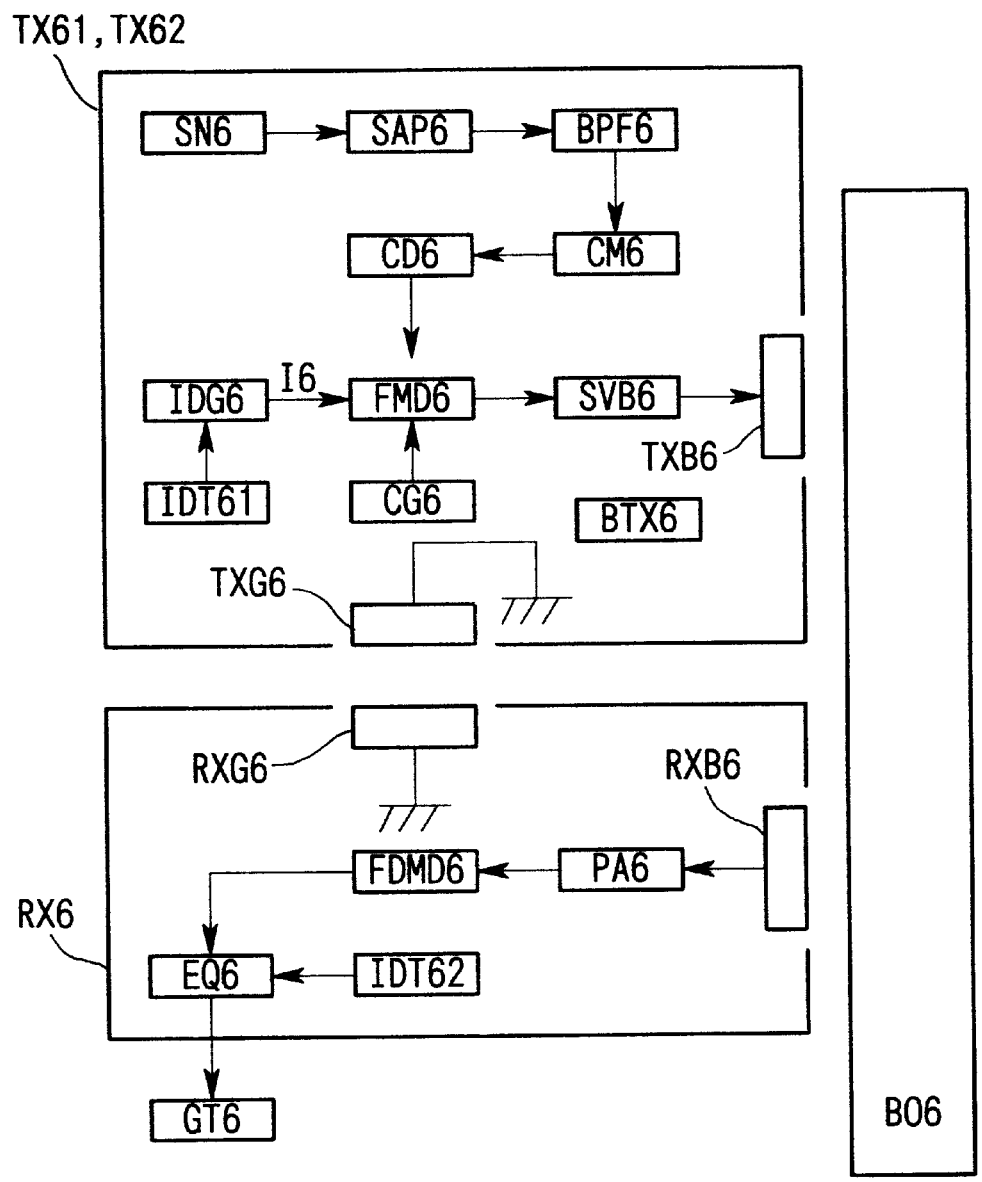
FIG. 26 is a block diagram showing an internal structure of the intra-body information transfer device of FIG. 25.

FIG. 26 is a block diagram of an internal structure of the intra-body information transfer device. The transmitter TX61 and the transmitter TX62 have similar internal structure, and hence only one transmitter is shown. In addition, the structure and operation of the transmitter TX61 and the transmitter TX62 as the ID sending device, and the method of communication with the receiver RX6 is similar to with the above embodiment. Therefore explanation will be omitted. The only difference between this embodiment and the above fifth embodiment is that the motion to push the button switch is replaced by an operation of "typing any physical object with a fingertip (means finger-tip typing action)".

In FIG. 26, SN6 denotes a shock (acceleration) sensor, SAP6 denotes a sensor amplifier, BPF6 denotes a band-pass filter, CM6 denotes a comparator, and CD6 denotes a code detector.

When a tip of a finger on which the transmitter TX61 is mounted, or any fingertip of a hand on which the transmitter TX62 is mounted strikes a desk, a wall or a supporting object such as a knee or thigh, the shock thereof passes through the finger (in the case of the transmitter TX61) or the finger and palm (in the case of the transmitter TX62), and reaches the shock sensor SN6 provided in the transmitter. Hence, a signal according to the shock reached is output to the sensor amplifier SAP6. The sensor amplifier SAP6 amplifies the signal output from the shock sensor SN6 and outputs the amplified signal to the band-pass filter BPF6.

The band-pass filter BPF6 passes only "a characteristic frequency band of a shock when finger-tip typing is performed on any physical object by the tip of a finger on which the shock sensor is installed (on which the transmitter TX61 is mounted)", or "a characteristic frequency band of a shock when finger-tip typing is performed on any physical object by the tip of any finger of a hand on which the shock sensor is installed (on which the transmitter TX62 is mounted)" among the input signals, and cuts out other signals. Hence, unnecessary signals resulting from "finger-tip typing action on any physical object by the tip of a finger other than the one on which the transmitter TX61 is mounted, in the case of mounting the transmitter TX61" or "the motion of a hand other than striking with a fingertip in the case of mounting the transmitter TX61 or in the case of mounting the transmitter TX62" can be eliminated. Hence erroneous operation can be suppressed. As an example of the band-pass filter BPF6, one which passes a frequency band of from 80 to 100 Hz is effective for both the case of mounting the transmitter TX61 and the case of mounting the transmitter TX62.

The signal having passed through the band-pass filter BPF6 is subjected to a threshold processing by the comparator CM6. That is, when an input higher than a predetermined threshold is made, the comparator CM6 sends a pulse to the code detector CD6 that finger-tip typing action has been performed. The code detector CD6 analyzes the timing of the pulse train sent, and when a specific pattern (command) is detected, activates a transmission section (ID table IDT61, ID generator IDG6, carrier oscillator CG6, FM modulator FMD6, and voltage amplifier SVB6) of the transmitter (TX61 or TX62), and sends a signal containing the ID information 16.

The operation of the code detector CD6 will now be described with reference to FIG. 27A~FIG. 27D as an actual example. In FIG. 27A~FIG. 27D, the left hand side shows an input pulse from the comparator CM6 to the code detector CD6, while the right hand side shows an output (code train of the analysis result) of the code detector CD6 which analyzed the input pulse.

First, finger-tip typing action is performed. Then after a pulse is sent from the comparator CM6, the code detector CD6 waits for the next pulse input, designating the leading time of the aforesaid pulse as the reference time 0. When the next pulse is input within a predetermined time T61 after the reference time, the code detector CD6 reckons the code as "0", returns the reference time to 0, and waits for the next pulse. When the next pulse input is performed within the predetermined time T62 (provided that T61<T62), the code detector CD6 reckons the code as "1", returns the reference time to 0, and waits for the next pulse. Thus, the code detector CD6 transforms the input pulses sent one after another into codes of "0" and "1" depending upon the time interval thereof. If the input pulse pauses, and there is no pulse input within the time T62, the code detector CD6 designates the final code as "1", closes the pulse train analysis and completes the encoding.

The relationship between the input pulse and the generated code is given below, taking examples of FIG. 27A~FIG. 27D.

Figure 27A:
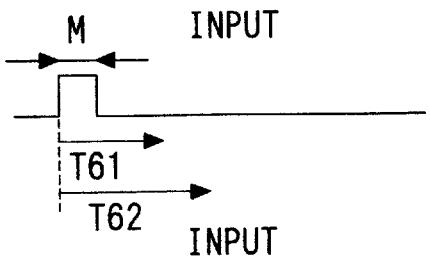
FIG. 27A is a diagram illustrating the operation of a code detector CD6 in the sixth embodiment.

In the case of FIG. 27A, there is only one input pulse. Hence since there is no next input pulse within the time T62, the code generated by the code detector CD6 is only "1" which is the final code.

Figure 27B:
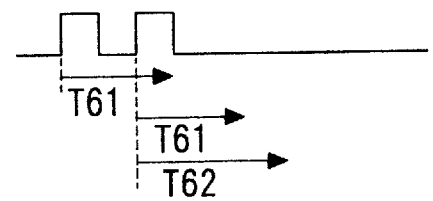
FIG. 27B is a diagram illustrating the operation of a code detector CD6 in the sixth embodiment.

In the case of FIG. 27B, since the second input pulse arrives within the time T61 after the first input pulse arrival, the first code will be "0". Then, since the third input pulse does not arrive within the time T62, the final code "1" is added, and as a result, the generated code will be "01".

Figure 27C:
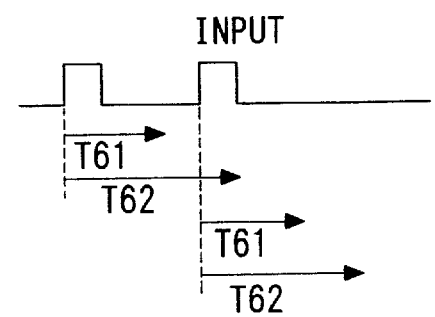
FIG. 27C is a diagram illustrating the operation of a code detector CD6 in the sixth embodiment.

In the case of FIG. 27C, since the second input pulse arrives within the time T62 after the first input pulse arrival, the first code will be "1". Then, since the third input pulse does not arrive within the time T62, the final code "1" is added, and as a result, the generated code will be "11".

Figure 27D:
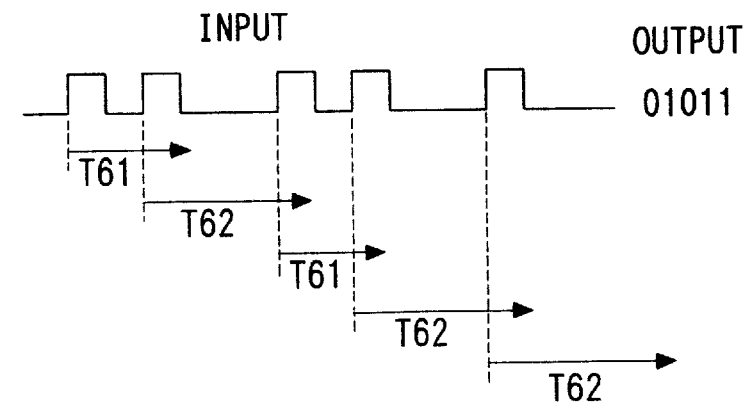
FIG. 27D is a diagram illustrating the operation of a code detector CD6 in the sixth embodiment.

In the case of FIG. 27D, since the second input pulse arrives within the time T61 after the first input pulse arrival, the first code will be "0", and since the third input pulse arrives within the time T62 after the second input pulse arrival, the next code will be "1". Then, since the fourth input pulse arrives within the time T61 after the third input pulse arrival, the next code will be "0". Furthermore, since the fifth input pulse arrives within the time T62 after the fourth input pulse arrival, the next code will be "1". Thereafter, since the sixth input pulse does not arrive within the time T62, the final code "1" is added, and as a result, the generated code will be "01011".

Hence, for example, as shown in FIG. 27D, the time interval of the pulse generation is used to form a code train of "0" and "1" like the Morse code. However, the generation of the code train described here differs from the Morse code in that the final code always becomes "1".

In these figures, the pulse width M is constant. However if for example the pulse width M is changed according to the typing strength of the input, then more complicated encoding becomes possible by using only the pulse width, or both the pulse width and the pulse interval.

The code detector CD6 activates the transmission section of the transmitter when a specific pattern is detected in the code train thus generated.

Furthermore, the specific pattern recognized by the code detector CD6 may be not only one but may be in a plural number, and the pattern may be rewritable from outside. Moreover, the ID to be sent out may be changed by controlling the ID generator IDG6 according to the detected pattern.

Furthermore, in the transmitter, the ID information 16 and the pattern (corresponding to the command) may be superposed and sent out, and the receiver side may separate and identify the information. Hence, the receiver side can definitely know "who (ID)" and "what (command)" is issued.

According to this embodiment, the input can be made at any place, as compared with the abovementioned fifth embodiment which uses a method using a button switch BT5. Hence the serviceability is improved. Furthermore, if a specific pattern which is known to only one person is used, this can be utilized as a password which other people do not know. As described above, by making the transmitter in a ring shape and providing a finger-tip typing detection mechanism therein, the ID can be sent out only when finger-tip typing is performed with a fingertip of a finger on which the transmitter is mounted, with a specific timing. In addition, by making the transmitter in a bracelet shape, the ID can be sent out only when finger-tip typing is performed with any fingertip of a hand on which the transmitter is mounted, with a specific timing.

Seventh Embodiment
(Fingering)

Figure 28:
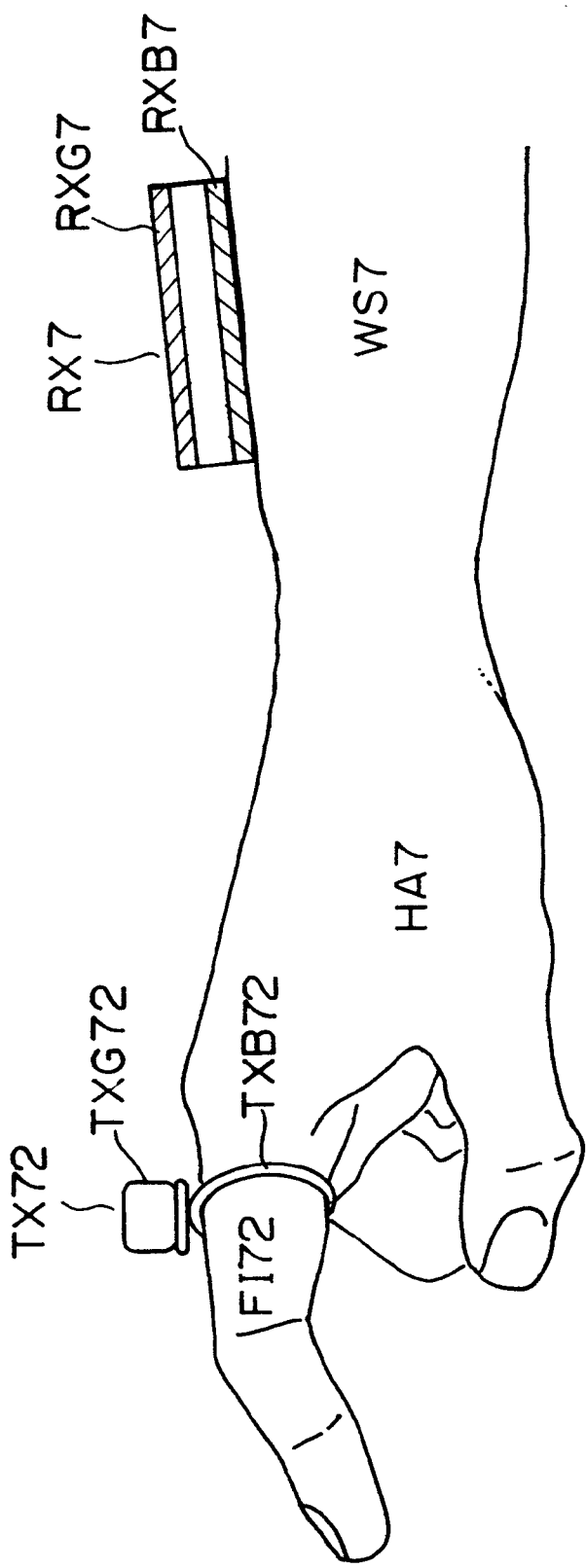
FIG. 28 is a view schematically showing a wearable keyboard unit according to a seventh embodiment of the present invention.

A seventh embodiment which utilizes the intra-body information transfer device according to the present invention as a wearable keyboard unit will now be described. FIG. 28 is a view schematically showing a wearable keyboard unit according to this embodiment, while FIG. 29 is a block diagram showing an internal structure thereof In FIG. 28, transmission modules other than the transmission module mounted on the forefinger are omitted, but transmission modules TX71, TX73, TX74, and TX75 are respectively mounted on the other four fingers.

Figure 29:
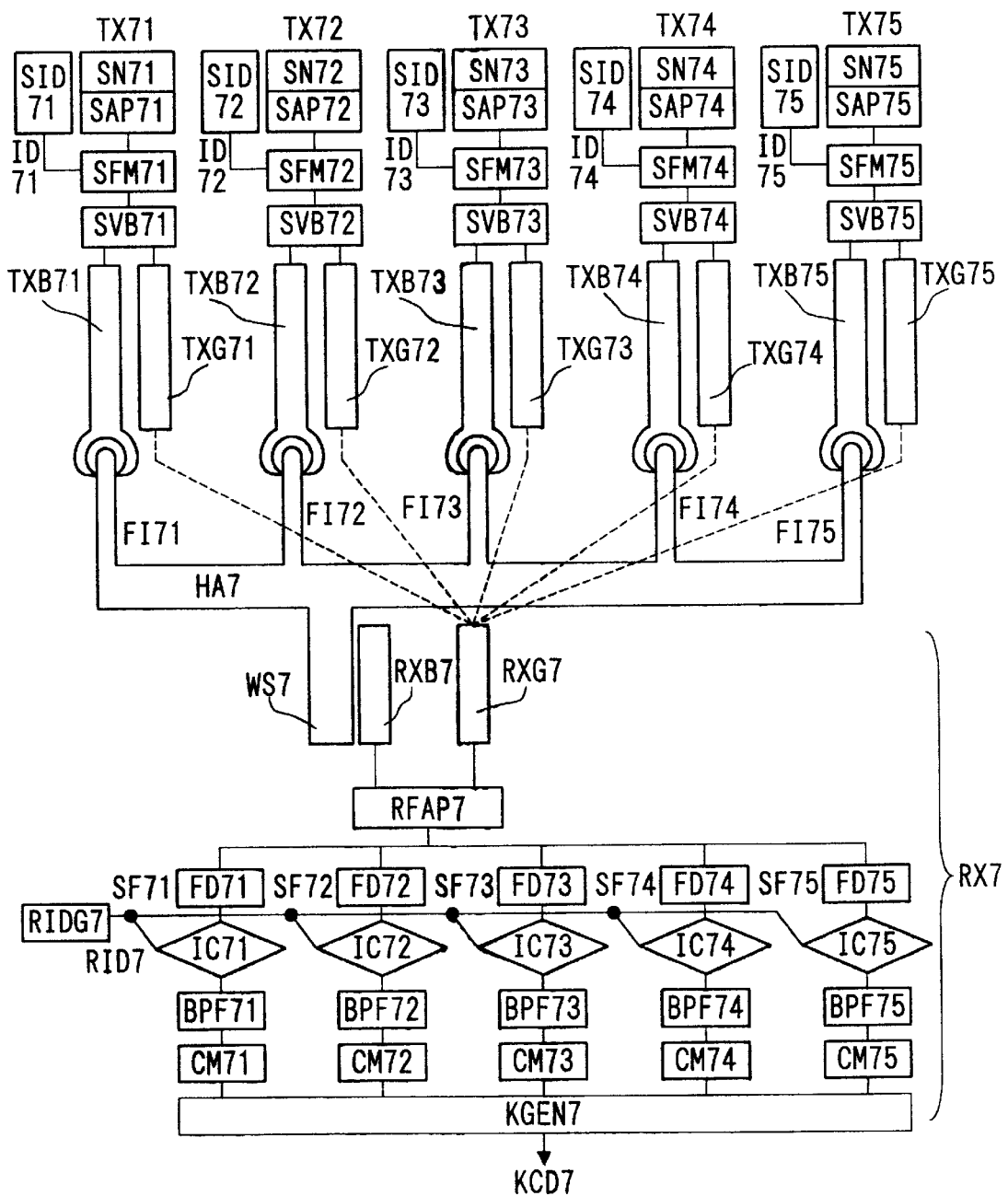
FIG. 29 is a block diagram showing an internal structure of the intra-body information transfer device of FIG. 28.

In FIG. 28 and FIG. 29, HA7 denotes a hand. Transmission modules TX71~TX75 are mounted on the base of each finger FI71~FI75. Inside of the respective transmission modules TX71~TX75 are respectively built, shock sensors SN71~SN75, sensor amplifiers SAP71~SAP75, transmission identification number generators SID71~SID75, FM modulators SFM71~SFM75 and voltage amplifiers SVB71~SVB75. In addition, the ring shape base of the respective transmission modules TX71~TX75 are the transmission B electrodes TXB71~TXB75, while the upper case of respective transmission modules TX71~TX75 are the transmission G electrodes TXG71~TXG75. Here, the transmission G electrodes TXG71~TXG75 serve as the negative electrodes of the transmission modules TX71~TX75 and as a shield of the internal circuit.

RX7 is a reception module mounted on a wrist. Inside of the reception module RX7 is built, a high-frequency amplifier REAP7, FM demodulators FD71~FD75, a reception identification number generator RIDG7, identification number comparators IC71~IC75, band-pass filters for detecting finger-tip typing (action) BPF71~BPF75, comparators CM71~CM75, and a key code generator KGEN7. The reception B electrode RXB7 is installed on the skin side of the wrist, while the reception G electrode RXG7 is installed on the external side which is opposite to the wrist.

The intra-body information transfer device according to this embodiment constitutes a full-time wearable input unit which performs input of information by striking a physical surface of an object with a number of fingertips. Signals from the shock sensors SN71~SN75 are transmitted from the transmission modules TX71~TX75 mounted on each finger to the reception module RX7 mounted on the wrist to generate the key code KCD7. The operation thereof will now be described in detail.

The shock sensors SN71~SN75 of the respective transmission modules (hereinafter, simply referred to as "shock sensor SN7", with other elements referred to similarly) detect a shock generated when the tip of a finger on which the transmission module is mounted strikes the physical surface of the object, the shock being transmitted through the base of the finger. The transmission identification number generator SID7 respectively generates transmission identification numbers ID71~ID75, and supplies these to the FM modulator SFM7. Incidentally, the transmission identification number ID7 does not always differ for each generator, and only one number may be given to one user.

The finger-tip typing shock detected by the shock sensor SN7 is amplified by the sensor amplifier SAP7, and input to the FM modulator SFM7 together with the transmission identification number ID7 generated by the transmission identification number generator SID7. Each FM modulator SFM7 superposes the transmission identification number ID7 on the amplified shock signal from the sensor amplifier SAP7, and subjects the signal on which the identification number is superposed to frequency modulation with different carrier frequencies SF71~SF75 (of from several tens of KHz to several MHz), respectively. In addition, by using a timer IC (NE555 or the like) as the FM modulator SFM7, the number of parts and the power consumption can be reduced.

The output from the FM modulator SFM7 is amplified by the voltage amplifier SVB7 and output to the human body via the transmission B electrode TXB7. Here, the negative electrodes of respective transmission modules (negative electrodes of the voltage amplifier SVB7) are connected to each transmission G electrode TXG7.

The high-frequency amplifier RFAP7 of the reception module RX7 amplifies the voltage between the reception B electrode RXB7 and the reception G electrode RXG7. Here, the transmission B electrode TXB7 and the reception B electrode RXB7 are coupled via the human body, while the transmission G electrode TXG7 and the reception G electrode RXG7 are coupled via air, as in the abovementioned embodiments. The signal amplified by the high-frequency amplifier RFAP7 is distributed to each FM demodulator FD7.

The FM demodulator FD7 performs demodulation based on the carrier frequency SF71~SF75, respectively, and divides the signal from the high-frequency amplifier RFAP7 into a shock signal and an identification number. Incidentally, by properly selecting the carrier frequency SF7, the route numbers communicable simultaneously can be increased while avoiding interference from other transmitters.

The identification number demodulated and divided by the FM demodulator FD7 is compared with the identification number inherent in the reception module RX7 supplied from the reception identification number generator RIDG7. The identification number comparator IC7 sends the shock signal to the band-pass filter BPF7, only when these identification numbers agree. The band-pass filter BPF7 is a filter which passes only the frequency band near 90 Hz which is characteristic of the shock signal at the time of finger-tip typing. Hence the shock signal of the same frequency band is extracted. The use of the band-pass filter BPF7 makes it possible to avoid interference due to typing with other fingers or by other motions of the hand.

The output from each band-pass filter BPF7 is subjected to threshold processing by each comparator CM7, and only the finger-tip typing shock by each finger is extracted and supplied to the key code generator KGEN7. The combination of extracted finger-tip typing shock of five fingers is transformed into the chord pattern and the key code KCD7 and then output.

One example of a method to determine the chord pattern and the key code in the key code generator KGEN7 will now be described. In this example, single typing with one finger, simultaneous typing with a number of fingers, and orderly typing which is made continuously with a number of fingers in turn with a slight time difference are combined. An example of the typing pattern which generates such a combination of finger-tip typing, and the chord pattern corresponding thereto are shown in FIG. 30A~FIG. 30D.

Referring to these figures, PFI71~PFI75 denote the finger-tip typing situation of each finger FI71~FI75. Each pulse shows that there is a strike, and the positive edge trigger on the left end of the pulse (the change point from the low level to the high level) shows the finger-tip typing time. In addition, the time T71 shown by a solid line in the figures is a reference time for when discriminating whether there is simultaneous typing or not. When a positive trigger edge is generated in the finger-tip typing situation of the other fingers within the time T71 after the finger-tip typing time, this is judged as simultaneous typing. On the other hand, the time T72 shown by a broken line in the figures is a reference time for when discriminating whether there is continuous finger-tip typing or not. When a positive trigger edge is generated in the finger-tip typing situation of the other fingers within the time T72 after the finger-tip typing time, this is judged as orderly typing. These times T71 and T72 are set beforehand with an appropriate time interval. As described above, the single finger-tip typing, simultaneous typing, and orderly typing are distinguished by two kinds of pre-set time intervals, with the finger-tip typing time as a base. The time t7S in the figures denotes the transformation starting time, while the time t7E denotes the transformation ending time.

Furthermore, the notation (five figures) of the "chord pattern" on the right side in the figures corresponds to the finger-tip typing situation of each finger, PFI71, PFI72, PFI73, PFI74 and PFI75 respectively, from the left. The meaning of each figure denotes "at what timing is finger-tip typing with that finger being performed". That is, "1"

denotes that it was struk for the first time, while "2" denotes that it was struk for the second time. When a number of figures are the same number, it shows that simultaneous typing was performed with fingers corresponding to these figures. Incidentally, "0" denotes no finger-tip typing.

Figure 30A:
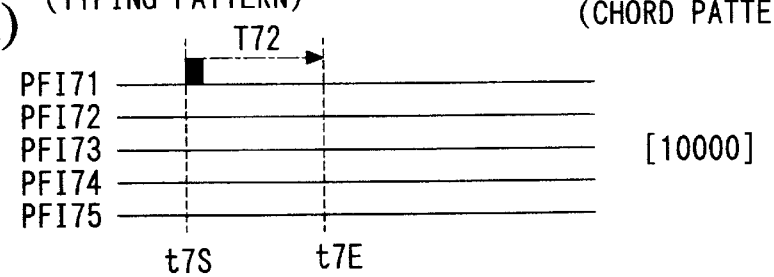
FIG. 30A is a diagram showing an example of a touching pattern and a chord pattern corresponding thereto in the seventh embodiment.
Figure 30B:
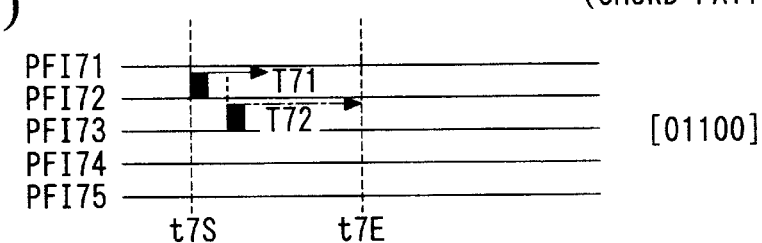
FIG. 30B is a diagram showing an example of a touching pattern and a chord pattern corresponding thereto in the seventh embodiment.
Figure 30C:
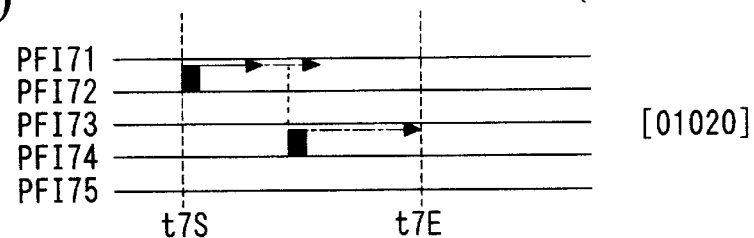
FIG. 30C is a diagram showing an example of a touching pattern and a chord pattern corresponding thereto in the seventh embodiment.
Figure 30D:
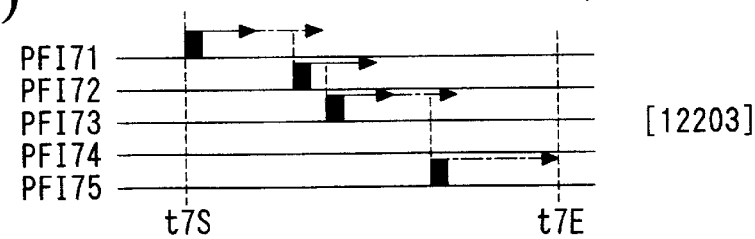
FIG. 30D is a diagram showing an example of a touching pattern and a chord pattern corresponding thereto in the seventh embodiment.

Assuming that only a single finger-tip typing was performed with a finger FI71, the typing pattern becomes as shown in FIG. 30A, and the chord pattern in that case becomes [10000]. On the other hand, when a simultaneous typing was performed with fingers FI72 and FI73, the typing pattern becomes as shown in FIG. 30B, and the chord pattern in that case becomes [01100]. When an orderly typing was performed in the order of finger FI72 and FI74, the typing pattern becomes as shown in FIG. 30C, and the chord pattern in that case becomes [01020]. Furthermore, when a single finger-tip typing with a finger FI71, a simultaneous typing with fingers FI72 and FI73, and a single finger-tip typing with a finger FI75 are performed continuously, the typing pattern becomes as shown in FIG. 30D, and the chord pattern in that case becomes [12203].

The key code generator KGEN7 determines the chord pattern based on the finger-tip typing shock supplied from the comparator CM7 by the above method. By referring to the "chord pattern"—"key cord" table as shown in FIG. 31, the key cord KCD7 according to the finger-tip typing shock is determined and output. The "chord pattern"—"key cord" table as shown in FIG. 31 is set in advance and stored.

The method for key code generation in the key code generator KGEN7 described above has also been introduced in Japanese Patent Application, First Publication, No. Hei 7-121294 (1995), "Full-time wearable input unit" and the like.

As the power supply source for the transmission module TX7, an electric double layer capacitor which can be easily usable repeatedly is suitable. Furthermore, as a charging device, light charging using a solar cell or a magnetic coupling method by means of a coil can be considered.

While the embodiments of the present invention have been described with reference to the drawings, the actual structure is not limited to these embodiments, and all design changes not departing from the scope of the present invention are included in the present invention.

What is claimed is:

1. An intra-body information transfer device comprising:
   transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body, and
   reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source,
   wherein the reference voltage to which said transmission G electrode is connected is a signal ground of said transmission means, a positive power source, or a negative power source.

2. An intra-body information transfer device comprising:
   transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body; and
   reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;
   wherein the reference voltage to which said reception G electrode is connected is a signal ground of said reception means, a positive power source, or a negative power source.

3. An intra-body information transfer device comprising:
   transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body; and
   reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;
   wherein the connection end of said transmission B electrode is made the reference voltage of said transmission means, and the connection end of said transmission G electrode is made the output from said modulation means.

4. An intra-body information transfer device comprising:
   transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body; and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;

wherein the electrode connected to the reference voltage of said reception means is made said reception B electrode instead of said reception G electrode.

5. An intra-body information transfer device according to claim 2, wherein the connection end of said transmission B electrode is made the reference voltage of said transmission means, and the connection end of said transmission G electrode is made the output from said modulation means, and the electrode connected to the reference voltage of said reception means is made said reception B electrode instead of said reception G electrode.

6. An intra-body information transfer device comprising:

transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body;

reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;

identification information generating means for generating identification information set in advance;

identification information superposing means for superposing identification information onto a signal output from said signal source, and transmitting the superposed signal to said modulating means;

identification information separation means for separating the output from said demodulation means of said reception means into the signal output from said signal source and said identification information; and comparison means for comparing said identification information and identification information inherent in said reception means.

7. An intra-body information transfer device according to claim 6, wherein a number of combinations of said transmission means and said reception means are used, and specific identification information is set in advance for each combination or each number of combinations.

8. An intra-body information transfer device comprising:

transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body; and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;

wherein said transmission means is of a shape which is mountable on the finger of a person, and said reception means is of a shape which is mountable on the wrist of a person.

9. An intra-body information transfer device comprising:

transmission means having a signal source for outputting a time varying signal, modulation means for modulating a signal from said signal source using a carrier frequency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body; and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;

wherein said reception means is of a shape which is mountable on the finger of a person, and said transmission means is of a shape which is mountable on the wrist of a person.

10. An intra-body information transfer device comprising:

transmission means having a signal source for outdutting a time varying signal, modulation means for modulating a signal from said signal source using a carrier frequency of from several tens of KHz to several MHz, a transmission B electrode connected to an out put from said modulation means and arranged in the vicinity of a human body surface, and a transmission G electrode connected to a reference voltage of the transmission means and arranged toward an external side with respect to the human body; and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means conneced to an output from said amplifying means for demodulating a signal output from said signal source;

wherein said transmission means is of a shape which is mountable in the vicinity of an eyeball, providing an additional function of a head mount display.

11. An intra-body information transfer device comprising:

transmission means having a signal source for outputting a time varying signal, modulation means for modulating a signal from said signal source using a carrier freguency of from several tens of KHZ to several MHz, a transmission B electrode connected to an output from said modulation means and arranged in the vicinity of a human body surface, and a transmission G electrode connected to a reference voltage of the transmission means and arranged toward an external side with respect to the human body; and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;

wherein said reception means is of a shape which is mountable in the vicinity of an eyeball, providing an additional function of a head mount display.

12. An intra-body information transfer device according to claim 2, wherein said reception means is of a shape which can be hooked to the ear or inserted into the ear hole, providing an additional function of an earphone.

13. An intra-body information transfer device comprising:

transmission means having a signal source for outputting a time varying signal, modulation means for modulating a signal from said signal source using a carrier freguency of from several tens of KHz to several MHz, a transmission B electrode connected to an output from said modulation means and arranged in the vicinity of a human body surface, and a transmission G electrode connected to a reference voltage of the transmission means and arranged toward an external side with respect to the human body; and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, amplifying means for amplifying a voltage between said reception B electrode and said reception G electrode, and demodulation means connected to an output from said amplifying means for demodulating a signal output from said signal source;

wherein said transmission means is of a shape which can be mounted on the mouth, providing an additional function of a microphone.

14. An intra-body information transfer device comprising:

transmission means having a signal source for outputting a time varying signal, first modulation means for modulating a signal from said signal source using a first carrier frequency set in advance, a first transmission B electrode connected to an output from said first modulation means and arranged in the vicinity of a human body surface, and a first transmission G electrode connected to a reference voltage of the transmission means and arranged toward an external side with respect to the human body;

relay means comprising; a receiving section having a first reception B electrode arranged in the vicinity of the human body surface in the vicinity of said transmission means, a first reception G electrode connected to a reference voltage of the receiving section and arranged toward an external side with respect to the human body so as to be coupled with said first transmission G electrode via air, and first demodulation means for demodulating a signal of a voltage between said first reception B electrode and first reception G electrode using said first carrier frequency, and a transmitting section having a second modulation means for modulating a signal output from said receiving section using a second carrier frequency set in advance differently from said first carrier frequency, connected to said receiving section, a second transmission B electrode connected to the output from said second modulation means and arranged in the vicinity of the human body surface, and a second transmission G electrode connected to the reference voltage of the transmitting section and arranged toward an external side with respect to the human body; and reception means having a second reception B electrode arranged in the vicinity of the human body surface in the vicinity of said relay device, a second reception G electrode connected to the reference voltage of the receiving section and arranged toward an external side with respect to the human body so as to be coupled with said second transmission G electrode via air, and second demodulation means for demodulating a signal of a voltage between said second reception B electrode and second reception G electrode using said second carrier frequency, wherein the signal from said signal source is transmitted between said transmission means and said relay means using said first carrier frequency, and then transmitted between said relay means and said reception means using said second carrier frequency, thereby performing communication over a long distance which cannot be attained with a single combination of a transmission means and a reception means.

15. An intra-body information transfer device according to claim 14, wherein a plurality of said relay means using a carrier frequency set in advance are provided, and the signal from said transmission means is successively relayed between said plurality of relay means, to thereby transmit the signal to said reception means remotely located more than several centimeters to several meters away.

16. An intra-body information transfer device comprising: transmission means of a shape which can be mounted on a wrist or a finger, and having identification information generating means for generating identification information set in advance, modulation means for modulating a signal from said identification information generating means using a carrier frequency set in advance, a transmission B electrode connected to an output from said modulation means and arranged in the vicinity of a human body surface, and a transmission G electrode connected to a reference voltage of the transmission means and arranged toward an external side with respect to the human body, and reception means having a reception B electrode arranged in the vicinity of the human body surface in the vicinity of said transmission means, a reception G electrode connected to a reference voltage of the reception means and arranged toward an external side with respect to the human body so as to be coupled with said transmission G electrode via air, demodulation means for demodulating a signal of a voltage between said reception B electrode and reception G electrode using said carrier frequency, and comparison means for comparing the output signal from said demodulation means and identification information inherent in said reception means, wherein said reception means is provided in a predetermined gate mechanism, said reception B electrode is arranged on a surface of said gate mechanism, said reception G electrode is arranged on the surface of said gate mechanism in the vicinity of said reception B electrode, and further comprising switching means for switching said gate mechanism in response to the output from said comparison means, wherein the portion of the human body where said transmission means is mounted is brought into contact with or close to said reception B electrode or said reception G electrode, to thereby switch said gate mechanism.

17. An intra-body information transfer device according to claim 16, wherein said transmission means further comprises; a signal source for outputting a time varying signal, and identification information superposing means for superposing a signal from said identification information generating means onto a signal from said signal source, and transmitting the superposed signal to said modulating means, and said reception means further comprises identification information separation means for separating the output from said demodulation means into the signal from said signal source and said identification information, and supplying the separated identification information to said comparison means.

18. An intra-body information transfer device according to claim 16, wherein said transmission means further comprises; shock detection means positioned at base of a finger for detecting a shock generated and transmitted through the finger when the finger-tip of the finger on which said transmission means is mounted, strikes the physical surface, typing detection means for detecting the presence or absence of finger-tip typing by said finger by judging the presence or absence of a specific frequency component of from around 80 to 100 Hz contained in the output signal from said shock detection means, command determination means for determining a command to be output according to the combination of the typing timing output from said typing detection means, and identification information superposing means for superposing identification information from said identification information generating means onto a command determined by said command determination means, and supplying this to said modulating means, said reception means further comprises identification information separation means for separating the output from said demodulation means into said command and said identification information, and supplying this to said comparison means, and said comparison means comprises; first comparison means for comparing said command with a command table inherent in said reception means, and second comparison means for comparing identification information with an identification information table inherent in said reception means, and said switching means switches said gate mechanism in response to a combination of the outputs from both of said first and second comparison means.

19. An intra-body information transfer device according to claim 18, wherein the mounting location for said transmission means is the wrist, and said command comes into effect by typing any physical object with the finger-tip of any finger of the hand on which the transmission means is mounted.

20. An intra-body information transfer device forming a part of a full-time wearable input unit which performs input of information by typing any physical object with finger-tip of one or more fingers, said information transfer device comprising:

transmission means comprising a group of transmitters mounted on the base of each finger, said transmitters having, respectively, a shock detection means for detecting shocks generated and transmitted through the finger when the fingertip of the finger on which said transmitter is mounted, strikes the physical surface, modulation means for modulating a frequency at the output from said shock detection means by using a carrier frequency of from several tens of KHz to several MHz which is different for each finger, a transmission B electrode connected to an output from said modulation means and arranged in the vicinity of the skin surface of said finger base, and a transmission G electrode connected to a reference voltage of said transmitters and arranged on a back side of said finger base, which transmits the output from said shock detection means for each finger via a human body; and reception means mounted in the vicinity of the wrist of a hand on which said transmitting device is mounted, having a reception B electrode arranged in the vicinity of the skin surface near said wrist, a reception G electrode arranged on an upper face of said wrist so as to be coupled with said transmission G electrode for each finger via air and connected to a reference voltage of the reception means, amplifying means for amplifying a voltage between said reception B electrode and said reception G electrode, a group of demodulation means connected to an output from said amplifying means for discriminating a frequency modulation wave transmitted from respective transmitters for each finger depending upon the difference of the carrier frequency for said each finger and demodulating the output from said respective shock detection means, a group of typing detection means for detecting the presence or absence of finger-tip typing by said each finger by judging the presence or absence of a specific frequency component of from around 80 to 100 Hz contained in the output signal from said shock detection means of said each finger, and a symbol determination means for determining a symbol to be output according to the combination of the typing timing for each finger.

21. An intra-body information transfer device according to claim 20, wherein said transmitters further comprise respective identification information generating means for generating identification information set in advance, and said modulating means carries out frequency modulation after said identification information has been superposed onto an output signal from said shock detection means, and said reception means further comprises a group of comparison means for comparing the identification information included in the respective outputs from said group of demodulation means and the identification information inherent in said reception means, and supplying the respective outputs from said group of demodulation means to said typing detection means based on the comparison result.

22. An intra-body information transfer device according to claim 2, wherein the connection end of said transmission B electrode is made the reference voltage of said transmission means, and the connection end of said transmission G electrode is made the output from said modulation means, and the electrode connected to the reference voltage of said reception means is made said reception B electrode instead of said reception G electrode.

23. An intra-body information transfer device according to claim 2, wherein said reception means is of a shape which can be hooked to the ear or inserted into the ear hole, providing an additional function of an earphone.

* * * * *